US012626440B2

(12) United States Patent
Taguchi et al.

(10) Patent No.: US 12,626,440 B2
(45) Date of Patent: May 12, 2026

(54) CORRECTION APPARATUS, SYSTEM, METHOD, AND PROGRAM

(71) Applicant: Rigaku Corporation, Tokyo (JP)

(72) Inventors: Shota Taguchi, Tokyo (JP); Takumi Ota, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 369 days.

(21) Appl. No.: 18/216,666

(22) Filed: Jun. 30, 2023

(65) Prior Publication Data

US 2024/0005569 A1 Jan. 4, 2024

(30) Foreign Application Priority Data

Jun. 30, 2022 (JP) ................................. 2022-105801

(51) Int. Cl.
*G06T 12/30* (2026.01)
*G06T 5/73* (2024.01)

(52) U.S. Cl.
CPC ................ *G06T 12/30* (2026.01); *G06T 5/73* (2024.01); *G06T 2207/10081* (2013.01)

(58) Field of Classification Search
CPC ..................... G06T 11/008; G06T 5/73; G06T 2207/10081; H04N 9/3179
See application file for complete search history.

(56) References Cited

U.S. PATENT DOCUMENTS

| | | | | |
|---|---|---|---|---|
| 5,784,431 A | * | 7/1998 | Kalend | G06V 10/757 378/65 |
| 2007/0195091 A1 | * | 8/2007 | Urushiya | A61B 6/5264 345/427 |

FOREIGN PATENT DOCUMENTS

| | | | | |
|---|---|---|---|---|
| CN | 115810032 | A | * | 3/2023 |
| JP | 2010181153 | A | * | 8/2010 |
| JP | 6383707 | B2 | * | 8/2018 |

OTHER PUBLICATIONS

Clackdoyle, Rolf, and Laurent Desbat. "Data consistency conditions for truncated fanbeam and parallel projections." Medical physics 42, No. 2 (2015): 831-845. (Year: 2015).*
Wester MJ, Schodt DJ, Mazloom-Farsibaf H, Fazel M, Pallikkuth S, Lidke KA. Robust, fiducial-free drift correction for super-resolution imaging. Sci Rep. Dec. 8, 2021;11(1):23672. doi: 10.1038/s41598-021-02850-7. PMID: 34880301; PMCID: PMC8655078. (Year: 2021).*

(Continued)

*Primary Examiner* — Stephen R Koziol
*Assistant Examiner* — Ashley Hytrek
(74) *Attorney, Agent, or Firm* — XSENSUS LLP

(57) ABSTRACT

A system that can reduce the cost for correcting artifacts due to motion in the reconstruction of CT images includes acquiring the temporarily corrected projection image and determining the reference center position correction function and the parameter of the temporary reference center position correction function by calculating a degree of coincidence between the temporarily corrected projection image and the projection image at the imaging angle opposing thereto, and correcting the main imaging data or the projection image based on the main imaging data using the reference center position correction function and the relative motion correction function.

12 Claims, 16 Drawing Sheets

(56) References Cited

OTHER PUBLICATIONS

Alexander Sasov, Xuan Liu, Phil L. Salmon, "Compensation of mechanical inaccuracies in micro-CT and nano-CT," Proc. SPIE 7078, Developments in X-Ray Tomography VI, 70781C (Sep. 17, 2008); https://doi.org/10.1117/12.793212 (Year: 2008).*

Gu, Jawook, Woong Bae, and Jong Chul Ye. "Translational motion correction algorithm for truncated cone-beam CT using opposite projections." Journal of X-ray science and technology 25, No. 6 (2017): 927-944. (Year: 2017).*

Cheng, Chang-Chieh, Yu-Tai Ching, Pai-Hung Ko, and Yeukuang Hwu. "Correction of center of rotation and projection angle in synchrotron X-ray computed tomography." Scientific reports 8, No. 1 (2018): 9884. (Year: 2018).*

Sasov et al., "Compensation of mechanical inaccuracies in micro-CT and nano-CT", Developments in X-Ray Tomography VI, edited by Stuart R. Stock, Proc. of SPIE, vol. 7078, No. 70781C, Sep. 2008, pp. 70781C-1-70781C-9.

* cited by examiner

SINOGRAM OF PROJECTION IMAGE

MEASURED
PROJECTION IMAGE

SINOGRAM AFTER TEMPORARY
CORRECTION AND
FAN-PARALLEL CONVERSION

OPPOSING DATA OF
PROCESSED PROJECTION
IMAGE

PROCESSED PROJECTION
IMAGE

VIEW OF MAIN/REFERENCE IMAGES

☐ (x, y) CALCULATED RANGE OF USE

☐ (x, y) SEARCH RANGE

☐ ORDER

☐ SEARCH RANGE OF REFERENCE CENTER POSITION

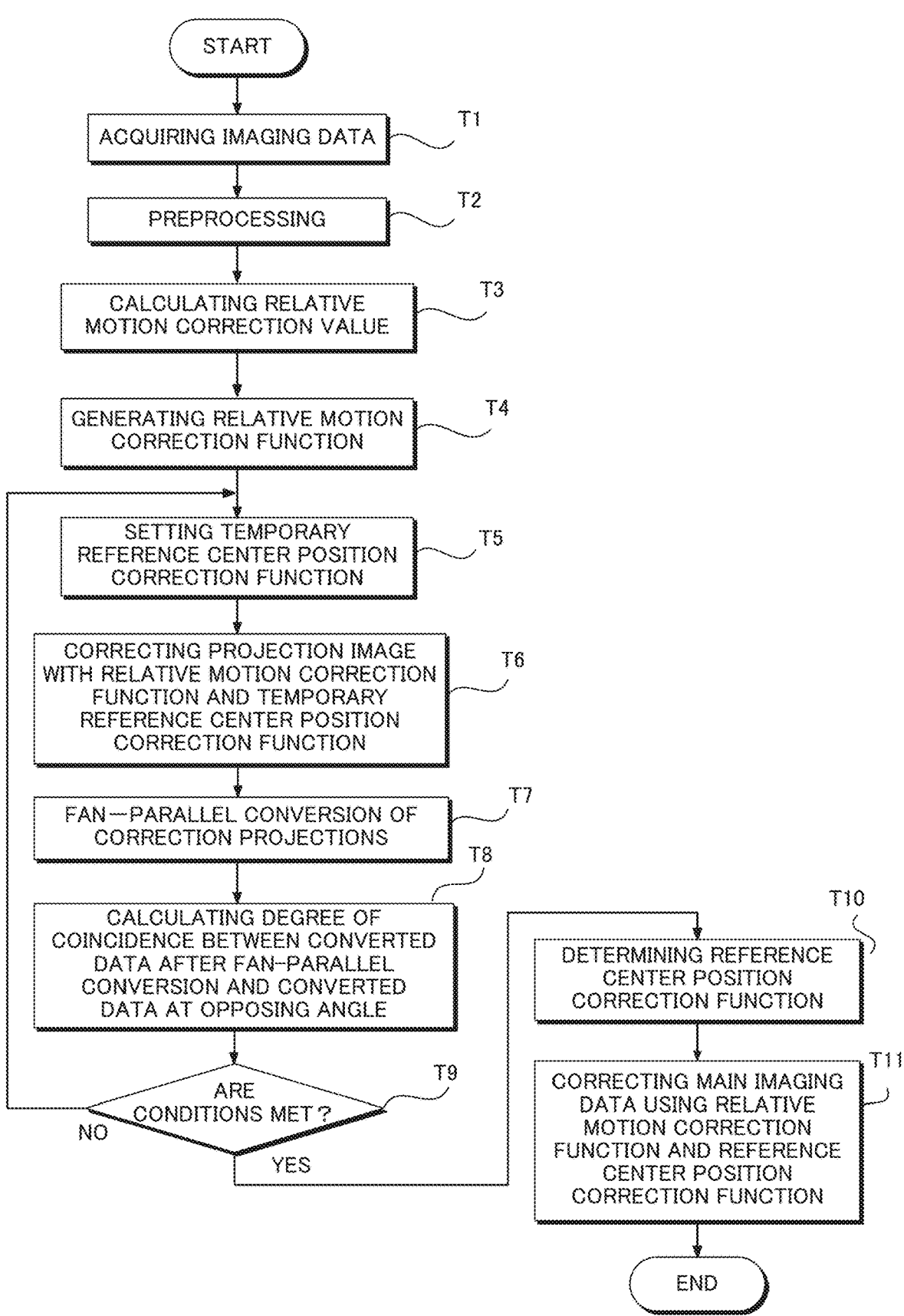

START

ACQUIRING IMAGING DATA — T1

PREPROCESSING — T2

CALCULATING RELATIVE
MOTION CORRECTION VALUE — T3

GENERATING RELATIVE MOTION
CORRECTION FUNCTION — T4

SETTING TEMPORARY
REFERENCE CENTER POSITION
CORRECTION FUNCTION — T5

CORRECTING PROJECTION IMAGE
WITH RELATIVE MOTION CORRECTION
FUNCTION AND TEMPORARY
REFERENCE CENTER POSITION
CORRECTION FUNCTION — T6

FAN—PARALLEL CONVERSION OF
CORRECTION PROJECTIONS — T7

CALCULATING DEGREE OF
COINCIDENCE BETWEEN CONVERTED
DATA AFTER FAN—PARALLEL
CONVERSION AND CONVERTED
DATA AT OPPOSING ANGLE — T8

ARE
CONDITIONS MET ? — T9
NO
YES

DETERMINING REFERENCE
CENTER POSITION
CORRECTION FUNCTION — T10

CORRECTING MAIN IMAGING
DATA USING RELATIVE
MOTION CORRECTION
FUNCTION AND REFERENCE
CENTER POSITION
CORRECTION FUNCTION — T11

END

FIG. 11

ESTIMATING REFERENCE CENTER POSITION

ESTIMATING REFERENCE CENTER POSITION

CORRECTION APPARATUS, SYSTEM, METHOD, AND PROGRAM

CROSS-REFERENCE TO RELATED APPLICATION

The present application claims priority under Japanese Patent Application No. 2022-105801, filed on Jun. 30, 2022, the entire contents of which are incorporated by reference in this application.

BACKGROUND

Field

The present disclosure relates to a correction apparatus, system, method and program for correcting an artifact.

Description of the Related Art

A CT apparatus reconstructs a CT image from a plurality of acquired imaging data acquired while rotating a sample or a gantry. In a CT apparatus, the movement of a sample or an optical system during a measurement is called motion. When imaging data with the motion are reconstructed without being corrected, blurs and streaky artifacts occur in the reconstructed CT image. Therefore, since the reconstructed image does not accurately reflect the shape of the sample, the quantitativity is lost.

In order to reduce such artifacts due to motion, imaging by introducing an apparatus other than a CT apparatus, corrections by devising an imaging method, or software have been conventionally performed.

Patent Document 1 discloses a technique of a deviation correction apparatus of an acquired image that corrects a deviation of an acquired image caused by a positional deviation of a imaging mechanism that irradiates a sample with radiation and captures a radiation image including transmitted radiation, wherein a plurality of radiation images obtained by capturing a sample image from a plurality of directions in a state in which a positional deviation of the imaging mechanism can occur are acquired, the radiation image is corrected in a coordinate axis direction of a predetermined coordinate system, a reconstruction calculation is executed based on the corrected radiation images, and an evaluation process for evaluating the quality of the obtained reconstruction information is repeated until the evaluation is highest, a reference image acquisition means that acquires radiation images generated in advance as a plurality of reference images showing a radiation image of a sample in a state in which a positional deviation of the imaging mechanism does not occur, a correction target image acquisition means that acquires a plurality of radiation images obtained as correction target images by capturing a sample in a state in which a positional deviation of the imaging mechanism can occur, and a correction section that corrects a correction target image in a coordinate axis direction of a predetermined coordinate system so that a degree of coincidence between corresponding images of the correction target image and the reference image is maximized.

Patent Document 2 discloses a technique of an X-ray tomography apparatus in which a tomographic image obtained by a reconstruction calculation using X-ray projection data in each projection direction acquired by an X-ray detector is forward-projected in the same direction as the projection direction, a deviation between the forward projection data and the acquired projection data is obtained, the projection data acquired based on the deviation is corrected, and a clear tomographic image with little influence can be obtained by performing a new reconstruction calculation regardless of the inaccuracy of the relative rotation between the pair of the X-ray generator and detector and the object.

Non-Patent Document 1 discloses a technique for by performing a first normal scan and a second coarse and quick scan, assuming no motion during the second quick scan, using a projection image of the second scan as a reference to correct a projection image obtained by the first measurement. In addition, Non-Patent Document 1 discloses a technique of gradually and precisely estimating a motion in repetition of projection and backprojection.

Patent Documents

Patent Document 1: JP-Patent No. 6383707
Patent Document 2: JP-A-2010-181153

Non-Patent Document

Non-patent Document 1: Developments in X-Ray Tomography VI, edited by Stuart R. Stock, Proc. of SPIE Vol. 7078, 70781C, (2008)•0277-786X/08/$18•doi: 10.1117/12.793212 "Compensation of mechanical inaccuracies in micro-CT and nano-CT"

However, in the techniques described in both of Patent Document 1 and Patent Document 2, the correction is performed using reconstructed images, thereby requiring calculation cost. In addition, in the technique of measuring twice among the techniques described in Non-Patent Document 1, some motions still remain even when the measurement is performed quickly, and for example, a motion or the like based on a tolerance error derived from a rotation axis cannot be corrected. Among the techniques described in Non-Patent Document 1, a technique of sequentially estimating a motion requires repetition of projection calculation and backprojection calculation, thereby requiring calculation cost.

SUMMARY

The present disclosure has been made in view of such circumstances, and an object of the present disclosure is to provide a correction apparatus, system, method, and program which can reduce the cost for correcting artifacts due to motion in reconstruction of CT images.

(1) In order to achieve the above object, the correction apparatus of the present disclosure is the correction apparatus for correcting artifacts due to motion during CT image measurement comprising an imaging data acquiring section for acquiring main imaging data scanned by 360° and reference imaging data, a preprocessing section for converting the main imaging data and the reference imaging data into projection images, a relative motion correction value calculating section for aligning the projection image based on the reference imaging data and the projection image based on the main imaging data corresponding to an imaging angle of the reference imaging data and calculating a relative motion correction value respectively for the imaging angle, a correction function generating section for generating a relative motion correction function for correcting a relative motion of all the main imaging data or all the projection image based on the main imaging data based on the relative motion correction value, a reference center position determining section for setting a temporary reference center position correction function and determining a reference center position correction function and a parameter of the temporary reference center position correction function, and a motion correcting section for temporarily correcting the projection image based on the main imaging data with the temporary reference center position correction function and the relative motion correction function, wherein the reference center position determining section acquires the temporarily corrected projection image and determines the reference center position correction function and the parameter of the temporary reference center position correction function by calculating a degree of coincidence between the temporarily corrected projection image and the projection image at the imaging angle opposing thereto, and the motion correcting section corrects the main imaging data or the projection image based on the main imaging data using the reference center position correction function and the relative motion correction function.

(2) Further, in the correction apparatus according to (1), the preprocessing section normalizes an X-ray intensity of the main imaging data or the reference imaging data and generates a feature extracted projection image in which a feature is extracted from a projection image based on the normalized main imaging data or reference imaging data, and the relative motion correction value calculating section calculates the relative motion correction value based on the feature extracted projection image of the reference imaging data and the feature extracted projection image of the main imaging data corresponding thereto.

(3) Further, in the correction apparatus according to (1) or (2), the preprocessing section performs noise removal before extracting the feature.

(4) Further, in the correction apparatus according to any one of (1) to (3), the motion correcting section temporarily corrects the feature extracted projection image based on the main imaging data, and the reference center position determining section acquires the temporarily corrected feature extracted projection image and determines a parameter of the temporary reference center position correction function by calculating a degree of coincidence between the temporarily corrected feature extracted projection image and the feature extracted projection image at an imaging angle opposing thereto.

(5) Further, in the correction apparatus according to any one of (1) to (4), the relative motion correction function is a polynomial of order determined based on the number of frames of reference imaging data.

(6) Further, in the correction apparatus according to any one of (1) to (5), the order of the relative motion correction function is less than or equal to ½ of the number of frames of the reference imaging data.

(7) Further, in the correction apparatus according to any one of (1) to (6), the main imaging data and the reference imaging data are data obtained with a fan beam or a cone beam, and the reference center position determining section acquires conversion data obtained by performing fan-parallel conversion on the temporarily corrected projection image and determines a parameter of the temporary reference center position correction function by calculating a degree of coincidence between the conversion data and the conversion data at an angle opposing thereto.

(8) Further, in the correction apparatus according to any one of (1) to (7), the calculation of the relative motion correction value or the determination of the parameter of the temporary reference center position correction function is performed based on a partial region of the projection image or the temporarily corrected projection image.

(9) Further, the correction apparatus according to any one of (1) to (8), further comprises a reconstruction section for performing reconstruction based on projection images based on the main imaging data corrected by the motion correcting section or the projection image based on the main imaging data and generating a CT image, and a display section for causing the displaying device to display the CT image.

(10) Further, the system of the present disclosure is a system comprising a CT apparatus comprising an X-ray source for generating X-rays, a detector for detecting X-rays and a rotation control unit for controlling the rotation of the X-ray source and the detector or the sample, and the correction apparatus according to any one of (1) to (9).

(11) Further, the method of the present disclosure is a method for correcting artifacts due to motion during CT image measurement, the method comprising the steps of acquiring main imaging data scanned by 360° and reference imaging data, converting the main imaging data and the reference imaging data into projection images, aligning the projection image based on the reference imaging data and the projection image based on the main imaging data corresponding to an imaging angle of the reference imaging data and calculating a relative motion correction value respectively for the imaging angle, generating a relative motion correction function for correcting a relative motion of all the main imaging data or all the projection image based on the main imaging data based on the calculated relative motion correction value, setting a temporary reference center position correction function, temporarily correcting the projection image based on the main imaging data with the temporary reference center position correction function and the relative motion correction function, acquiring the temporarily corrected projection image and determines a reference center position correction function and a parameter of the temporary reference center position correction function by calculating a degree of coincidence between the temporarily corrected projection image and the projection image at the imaging angle opposing thereto, and correcting the main imaging data or the projection image based on the main imaging data using the reference center position correction function and the relative motion correction function.

(12) Further, the program of the present disclosure is a program for correcting artifacts due to motion during CT image measurement, for causing a computer to execute the processes of, acquiring main imaging data scanned by 360° and reference imaging data, converting the main imaging data and the reference imaging data into projection images, aligning the projection image based on the reference imaging data and the projection image based on the main imaging data corresponding to an imaging angle of the reference imaging data and calculating a relative motion correction value respectively for the imaging angle, generating a relative motion correction function for correcting a relative motion of all the main imaging data or all the projection image based on the main imaging data based on the calculated relative motion correction value, setting a temporary reference center position correction function, temporarily correcting the projection image based on the main imaging data with the temporary reference center position correction function and the relative motion correction function, acquiring the temporarily corrected projection image and determines a reference center position correction function and a parameter of the temporary reference center position correction function by calculating a degree of coincidence between the temporarily corrected projection image and the projection image at the imaging angle opposing thereto, and correcting the main imaging data or the projection image based on the main imaging data using the reference center position correction function and the relative motion correction function.

BRIEF DESCRIPTION OF THE DRAWINGS

FIG. 11 is a flowchart showing a modified example of an operation of the correction apparatus.

DETAILED DESCRIPTION

Figure 1A:
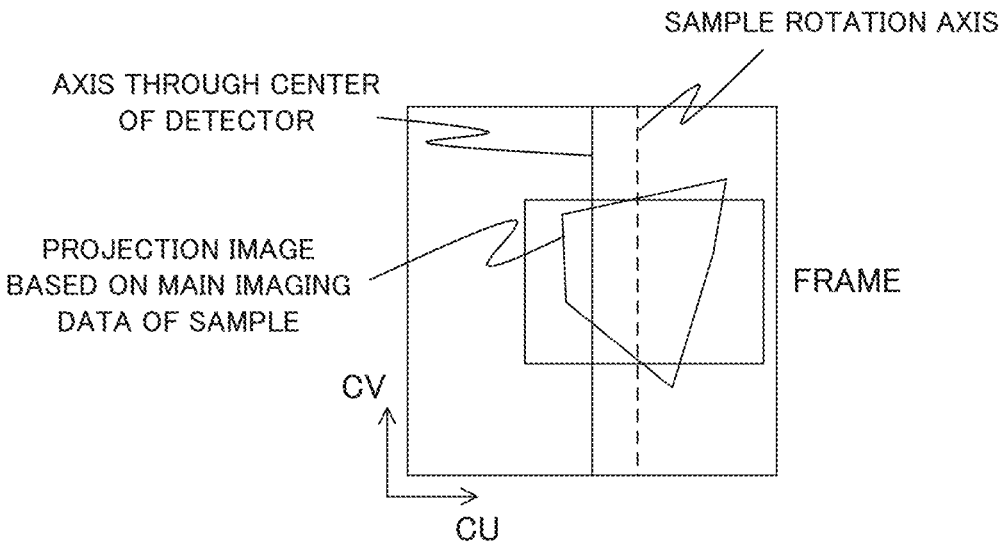
FIGS. 1A and 1B are schematic diagrams showing a projection image based on reference imaging data and a projection image based on corresponding main imaging data at a certain imaging angle, respectively.

Next, embodiments of the present disclosure are described with reference to the drawings. To facilitate understanding of the description, the same reference numerals are assigned to the same components in the respective drawings, and duplicate descriptions are omitted.

[Principle]

A CT apparatus irradiates a sample with X-rays of a parallel beam, a fan beam, or a cone beam from any angle, and acquires a distribution of the absorption coefficient of the X-rays, i.e., an imaging data, by the detector. To irradiate X-rays from any angle, the CT apparatus is configured to rotate the sample stage with respect to the fixed X-ray source and the detector or the gantry integrated with the X-ray source and the detector.

Thus, the imaging data of the sample acquired by performing projection from various angles are converted into projection images, and a distribution of the line absorption coefficient of the sample can be estimated by the gradation of the projection image. Then, it is called reconstruction that a three-dimensional line absorption coefficient distribution is obtained from two-dimensional projection images. The reconstruction is basically performed by backprojection of the projection image.

Motion refers to movement of a sample or an optical system during measurement of imaging data. Causes of motion include thermal drift, focus shift, tolerance error, and poor fixation of a sample. When reconstruction is performed without correcting projection images based on motion-occurred imaging data, blurs and streaky artifacts occur in the reconstructed CT image. Such artifacts are called artifacts due to motion. If artifacts due to motion occur, the reconstructed image does not accurately reflect the shape of the sample, thus the quantification is lost. The effect is particularly a problem in CT imaging with a resolution of the order of micrometers.

Conventionally, in order to suppress artifacts due to motion, imaging by introducing a device other than a CT apparatus, devising an imaging method, or correction by software has been performed. For example, there is a method that corrects them using three-dimensional position information measured by introducing a special apparatus such as a laser or a sensor into a CT apparatus. In this case, installation costs are incurred.

In addition, in the correction by software, image processing is performed for correction. For example, there is a method in which a plurality of radiation images acquired from a plurality of directions in a state in which positional deviation may occur are corrected in accordance with a coordinate axis direction of a predetermined coordinate system, reconstruction calculation is executed based on the corrected radiation images, and correction is performed by comparing the plurality of reference images with the plurality of reference images in which positional deviation does not occur and evaluating the quality of reconstruction information of the reconstructed image. Further, there is a method in which a tomographic image obtained by a reconstruction calculation using X-ray projection data is forward-projected in the same direction as the projection direction, a deviation between the forward projection data and the acquired projection data is obtained, and the acquired projection data is corrected based on the deviation to perform a new reconstruction calculation. However, all of them need the reconstruction, inevitably resulting in computational costs and practical problems.

Further, as a method of combining the contrivance of the imaging method and the correction by the software, there is a method of precisely measuring at a first time, quickly measuring at a second time, and correcting a projection image measured at the first time on the basis of a projection image measured at the second time (reference scan measurement). However, when such a method is used, a motion caused by the tolerance error derived from the rotation axis cannot be corrected, since the rotation axis may move regardless of the measurement time. Further, in the method of correcting the projection image without using the reconstructed image, since the calculation accuracy of the motion depends on the structure and the contrast of the sample, the accuracy of the correction is not sufficient for the sample which has the structure with both high and low contrast.

The present disclosure corrects the main imaging data by the following procedure. First, the main imaging data scanned by 360° and the reference imaging data are acquired and converted into projection images. Next, the projection image based on the reference imaging data and the projection image based on the main imaging data corresponding to the imaging angle of the reference imaging data are aligned, and the relative motion correction value is calculated for each imaging angle. Next, a relative motion correction function for correcting the relative motion based on the calculated relative motion correction value is generated. Next, a temporary reference center position correction function is set, and the projection image based on the main imaging data is temporarily corrected by the temporary reference center position correction function and the relative motion correction function. Next, the projection image based on the temporarily corrected main imaging data is acquired, and the reference center position correction function and the parameter of the temporary reference center position correction function are determined by calculating the degree of coincidence between the temporarily corrected projection image at a certain imaging angle and the projection image at the opposing imaging angle. Then, the main imaging data or the projection image based on the main imaging data is corrected using the reference center position correction function and the relative motion correction function.

Figure 1B:
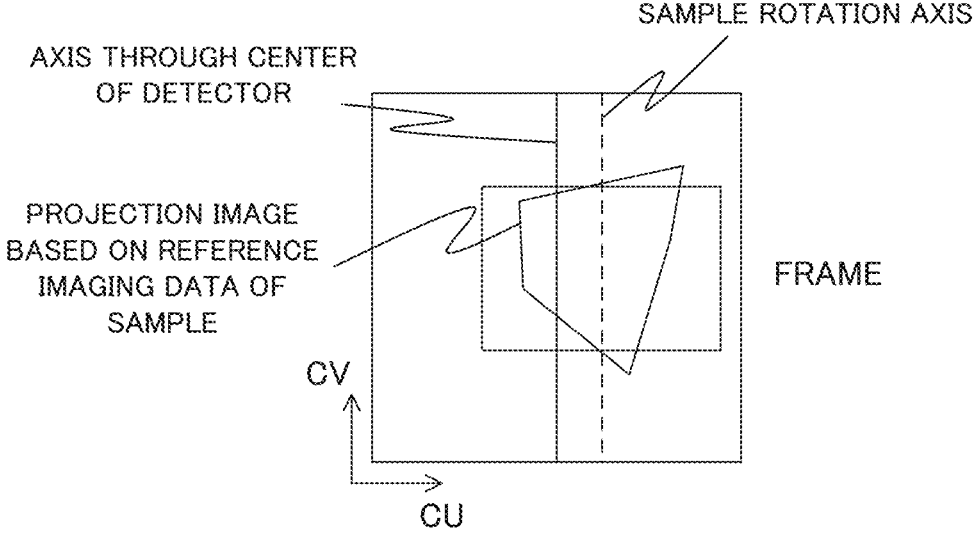

FIGS. 1A and 1B are schematic diagrams showing a projection image based on reference imaging data and a projection image based on main imaging data at a certain imaging angle, respectively. The position of the sample rotation axis is not actually displayed but is indicated for the sake of explanation. By comparing them, it is possible to calculate a relative motion correction value at a certain imaging angle. The relative motion correction value at a certain imaging angle is a moving amount in CU direction (x-axis direction) and CV direction (y-axis direction) of the main imaging data in which the degree of coincidence between the projection image based on the reference imaging data and the projection image based on the main imaging data corresponding thereto is the largest. In other words, the relative motion correction value is a deviation of the main imaging data with respect to the reference imaging data at a certain imaging angle. In the present specification, the relative motion is a deviation of the main imaging data with respect to the reference imaging data estimated from the relative motion correction value. Thus, by calculating the relative motion correction value, information for correcting the relative motion can be obtained.

In the present specification, the relative motion correction function is a function calculated based on a plurality of relative motion correction values and is a function for correcting the relative motion of all of the main imaging data or the projection image based on the main imaging data. As the relative motion correction function, any function may be used as long as the relative motion can be appropriately corrected.

If the sample rotation axis coincides with the center axis in the detector plane, a relative motion correction function is generated, and artifacts due to motion of CT images can be corrected by correcting the main imaging data or the projection image based on the main imaging data using the relative motion correction function. However, if the sample rotation axis does not coincide with the center axis in the detector plane, the artifacts due to motion of CT images cannot be corrected only by the correction using the relative motion correction function. In addition, the relative motion correction function generated by comparing the main imaging data with the reference imaging data cannot determine a deviation of the sample rotation axis. In CT imaging with a resolution of the order of micrometers, even a deviation of several pixels may be a problem. In such a case, for example, the deviation of the sample rotation axis can be obtained from the sequential calculation of the slice reconstruction, but it is necessary to perform the reconstruction, and the calculation takes time.

Figure 2A:
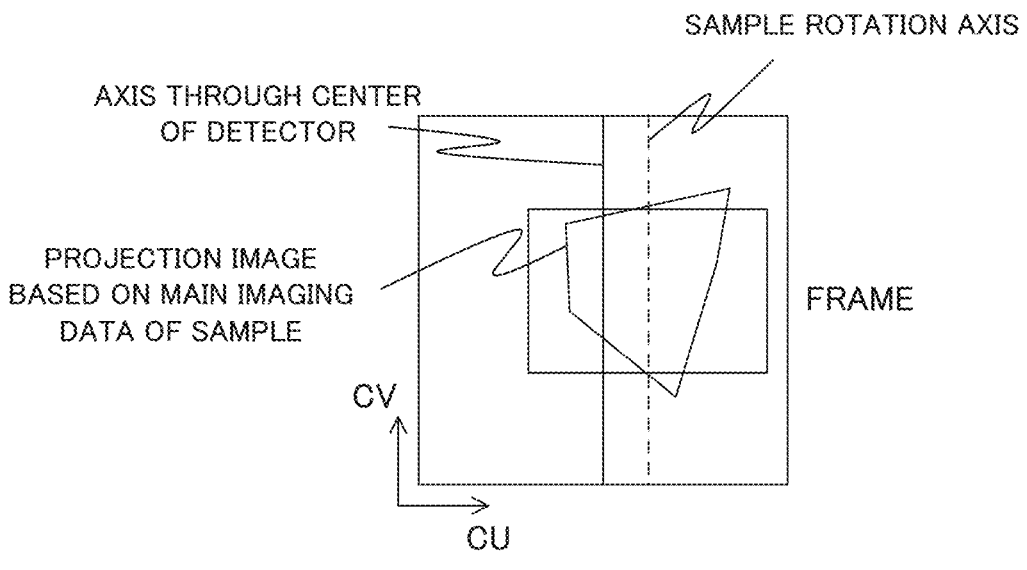
FIGS. 2A and 2B are schematic diagrams showing a projection image based on main imaging data at a certain imaging angle and a projection image based on main imaging data at an opposing imaging angle, respectively.
Figure 2B:
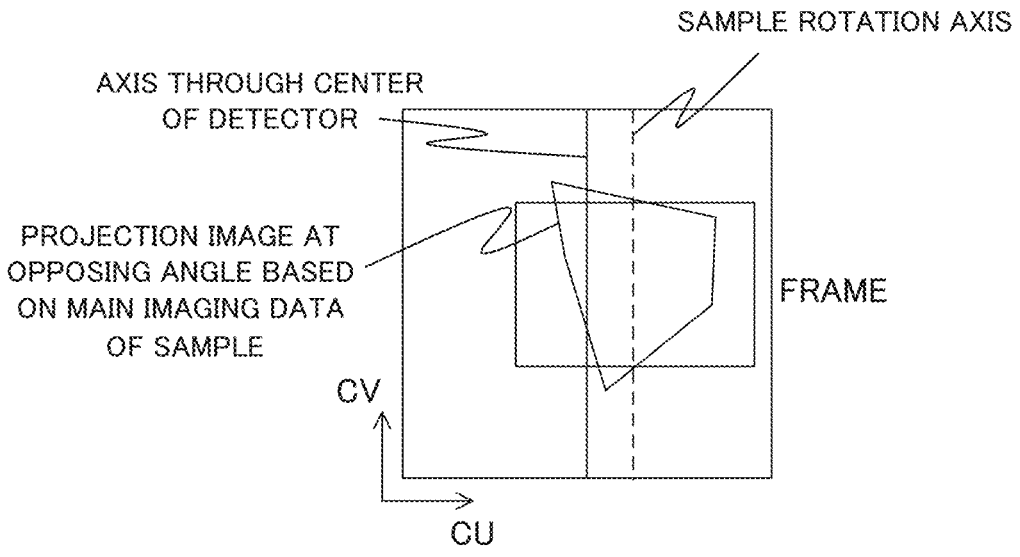

FIGS. 2A and 2B are schematic diagrams showing a projection image based on main imaging data at a certain imaging angle and a projection image based on main imaging data at an opposing imaging angle, respectively. By comparing these after correction (temporary correction) with the temporary reference center position correction function and the relative motion correction function, the parameters of the temporary reference center position correction function can be determined. This is referred to as a reference center position correction function. In the present specification, the reference center position correction function is a function representing a deviation of the sample rotation axis with respect to the central axis in the detector plane. The temporary reference center position correction function and the reference center position correction function may be constants. According to the correction method of the present disclosure, since the reference center position correction function is determined so that the degree of coincidence between the projection image after correction by the relative motion correction function and the projection image at the opposing angle is increased, it is not necessary to perform reconstruction, and the calculation time can be sufficiently reduced. In the present specification, the absolute motion is the sum of the reference center position correction function and the relative motion correction function.

With such a correction method, it is not necessary to introduce a special device such as a laser or a sensor, so that the introduction cost can be reduced. In addition, since correction is performed on the imaging data or the projection image, it is not necessary to repeat the reconstruction, and the calculation cost can be reduced. In addition, since the data used for generating the relative motion correction function for correcting the relative motion is the reference imaging data and the main imaging data, whereas the data used for determining the reference center position correction function is the main imaging data opposing to the main imaging data in which the relative motion is corrected, it is possible to correct not only the relative motion but also the motion derived from the rotation axis.

Corrections performed by the present disclosure are directed to translational motions of acquired images resulting from thermal drifting and poor fixation of a sample and focal shift during CT imaging. According to the correction method of the present disclosure, it is possible to accurately correct the absolute motion with suppressing the calculation cost by requiring no reconstruction, while the calculation accuracy is not affected by the structure and contrast of the sample.

Embodiment

The correction method according to the present disclosure is explained in detail, as described below. First, main imaging data scanned by 360° and reference imaging data are acquired. The main imaging data is preferably acquired by imaging 600 or more and 2400 or less frames at intervals of 0.15° to 0.6°. The reference imaging data is preferably acquired by imaging 8 or more and 36 or less frames at intervals of 10° to 45° before or after acquiring the main imaging data. The number of acquired frames of the reference imaging data is a divisor of the number of acquired frames of the main imaging data.

Next, the main imaging data and the reference imaging data are converted into projection images. The main imaging data and the reference imaging data can be converted into projection images by logarithmic conversion. Before converting the main imaging data or the reference imaging data into a projection image, it is preferable to normalize the X-ray intensity of the main imaging data or the reference imaging data, and to generate a feature extracted projection image in which features are extracted from the projection image based on the normalized main imaging data and the reference imaging data.

In the normalization of the X-ray intensity, it is preferable to rescale the X-ray intensity using the maximum value and the minimum value of the X-ray intensity of the main imaging data or the reference imaging data. By performing normalization using both the minimum value and the maximum value of the X-ray intensity, the intensity difference between the low contrast and the high contrast of the feature extracted projection image is reduced. Therefore, the low contrast structure is easily reflected in the calculation for the degree of coincidence. The normalization of the X-ray intensity can be performed, for example, using formula (1) below. In the following formula (1), I (x, y, θ) represents the X-ray intensity of a certain pixel at the imaging angle θ. Formula (1) below shows that the X-ray intensities of all the pixels at the imaging angle θ are respectively converted into the values of the numerical expression on the right side. $I_{max}$ (θ) and $I_{min}$ (θ) represent the maximum and minimum value of the histograms of the X-ray intensities obtained for each imaging angle θ, respectively. $I_{max}$ (θ) and $I_{min}$ (θ) may be the maximum and minimum value of the histograms of the X-ray intensities for the whole of the main imaging data or the entire reference imaging data, respectively. The normalization of the X-ray intensity is not limited to be performed by formula (1).

$$I(x, y, \theta) \to \frac{I(x, y, \theta) - I_{min}(\theta)}{I_{max}(\theta) - I_{min}(\theta)} \tag{1}$$

The feature extraction of the projection image is preferably performed by edge detection of the projection image. Edge detection can be performed, for example, using Sobel filters. Further, it is preferable to perform noise removal of the projection image before feature extraction of the projection image. The noise removal can be performed using, for example, a median filter or a Gaussian filter. The noise removal and edge detection can be achieved for the projection image, for example, by sequentially applying a median filter, a Gaussian filter, and a Sobel filter. The feature extraction and noise removal of the projection image is not limited to be performed by the median filter, the Gaussian filter, or Sobel.

By these processes, calculation accuracy is improved in calculation of the relative motion correction value and determination of the reference center position. In particular, it is effective for samples which have high and low contrast structures. Therefore, when there is no or very small tolerance error of the sample rotation axis, an embodiment of the present disclosure may include the processes of normalization of X-ray intensity, feature extraction of a projection image, generation of a relative motion correction function, and imaging data correction by a relative motion correction function. In this case, it is possible to obtain a better result than the conventional technique of correcting the relative motion without normalizing the X-ray intensity or extracting the feature of the projection image.

Next, the projection image based on the reference imaging data and the projection image based on the main imaging data corresponding to the imaging angle of the reference imaging data are aligned, and the relative motion correction value is calculated for each imaging angle. Note that, as described above, in the case where normalization of the X-ray intensity and noise removal and feature extraction of the projection image are performed, it is preferable that the projection image in the following process is a projection image obtained by normalization of the X-ray intensity, noise removal of the projection image and feature extraction (feature extracted projection image).

The alignment of the projection image based on the reference imaging data and the projection image based on the main imaging data corresponding to the imaging angle of the reference imaging data can be performed, for example, using formula (2) below. In the following formula (2), min represents the minimum value, and arg represents the argument that provides the value. $P_{main}$ and $P_{ref}$ of formula (2) represent a projection image based on the main imaging data and a projection image based on the reference imaging data at the imaging angle θ, respectively, and are defined by formulae (3) and (4) below. That is, MSE (Mean Squared Error) is calculated for the projection image based on the reference imaging data and the projection image based on the main imaging data at the respective imaging angles θ, and the shift amounts ($x_{shift}$, $y_{shift}$) in the x-axis direction and the y-axis direction of the projection image based on the main imaging data with the smallest MSE are obtained as the relative motion correction values. In the sigma calculation on the right side of formula (2), (x, y) may be all points on the projection image or may be limited to points within the frame set in the projection image. The function used for the alignment is not limited to MSE, and for example, a mutual information, a correlation function, or the like may be used.

$$\arg \min \, MSE(x_{shift}, y_{shift}, \theta) = \arg \min \left[ \sum_{x,y} (P_{main} - P_{ref})^2 \right] \tag{2}$$

$$P_{main} = P_{main}(x + x_{shift}, y + y_{shift}, \theta) \tag{3}$$

$$P_{ref} = P_{ref}(x, y, \theta) \tag{4}$$

Next, a relative motion correction function for correcting the relative motion of all the main imaging data or all the projection image based on the main imaging data based on the plurality of calculated relative motion correction values is generated. It is preferable that the relative motion correction function is generated respectively in the x-axis direction and the y-axis direction based on the calculated relative motion correction value. As the relative motion correction function, any function can be used as long as the relative motion can be appropriately corrected, and for example, a finite-order polynomial, a Fourier series, a spline function, or the like can be used in which the rotation angle θ around the sample rotation axis is a variable. As the relative motion correction function, it is convenient to use a polynomial. When a polynomial is used, the relative motion correction function can be obtained by performing polynomial interpolation based on the relative motion correction value. In the following description, the relative motion correction functions in the x-axis direction and the y-axis direction, where the rotation angle θ around the sample rotation axis is a variable, are respectively referred to as $x_{shift}$ (θ), $y_{shift}$ (θ).

The relative motion correction function is preferably a polynomial of order determined based on the number of frames of reference imaging data. When the relative motion correction function is a polynomial, the order of the relative motion correction function is preferably ½ or less of the number of frames of reference imaging data. Accordingly, the order of the relative motion correction function can be reduced within an appropriate range, and the cost required for processing can be reduced.

Next, a temporary reference center position correction function is set, and the projection image based on the main imaging data is corrected by the temporary reference center position correction function and the relative motion correction function. The correction of the projection image based on the main imaging data by the temporary reference center position correction function and the relative motion correction function is referred to as temporary correction. The temporary reference center position correction function center (θ) may be a constant or may have an angular dependency. For example, when the rotation axis projected on the detector is expected to move like a sine wave, a model having an amplitude and a phase as parameters can be considered. Such a temporary reference center position correction function center (θ) is expressed, for example, by the following formula (5). a, δ and b are parameters. $P_1$ indicates a projection image based on the main imaging data that is temporarily corrected by the temporary reference center position correction function and the relative motion correction function. $P_1$ is expressed by the following formula (6).

$$\text{center}(\theta) = a \cos(\theta + \delta) + b \tag{5}$$

$$P_1 = P_{main}(x + x_{shift}(\theta) + \text{center}(\theta), y + y_{shift}(\theta), \theta) \tag{6}$$

Next, a projection image based on the temporarily corrected main imaging data is acquired, and the parameters of the temporary reference center position correction function is determined by calculating the degree of coincidence between the temporarily corrected certain projection image and the projection image at the imaging angle opposing to the temporarily corrected certain projection image. $P_2$ is a projection image in which the projection image based on the main imaging data at the imaging angle opposing to temporarily corrected $P_1$ inverted in x direction with respect to the temporary reference center position. $P_2$ is expressed by formula (7) below. The minus of the x coordinate represents the inversion.

$$P_2 = P_{main}(-x + (x_{shift}(\theta + \pi) + \text{center}(\theta + \pi)), y + y_{shift}(\theta + \pi), \theta + \pi) \tag{7}$$

The determination of the temporary reference center position correction function and the reference center position correction function based on the calculation of the degree of coincidence between the temporarily corrected certain projection image and the projection image at the imaging angle opposing to the temporarily corrected certain projection image can be performed, for example, by using formula (8) below. $P_1$ and $P_2$ in formula (8) are $P_1$ and $P_2$ described above. That is, in the set temporary reference center position correction function center (θ), MSE is calculated for the projection image based on the temporarily corrected main imaging data and the projection image at the opposing imaging angle. Then, the parameters of the temporary reference center position correction function center (θ) with the smallest MSE are obtained, and the parameters are used as the reference center position correction function.

$$\arg \min MSE \, (\text{center} \, (\theta)) = \arg \min \left[ \sum_{x,y,\theta} (P_1 - P_2)^2 \right] \tag{8}$$

In the sigma calculation on the right side of formula (8), (x, y) used to determine the parameters of the temporary reference center position correction function may be all points on the projection image or may be limited to points within the frame set in the projection image. Further, the projection image used for determining the parameters of the temporary reference center position correction function may be calculated not from the projection image based on all the main imaging data but from a part of the projection image based on the main imaging data and the projection image opposing thereto. That is, the parameters of the temporary reference center position correction function may be calculated from the projection image based on the main imaging data corresponding to a part of the values of θ and the projection image opposing thereto. As a result, the calculation cost for determining the reference center position correction function can be reduced. The function used for calculating the degree of coincidence is not limited to MSE, and for example, a mutual information, a correlation function, or the like may be used.

Then, the projection image based on the main imaging data or the main imaging data is corrected using the determined reference center position correction function and the relative motion correction function. In this way, the absolute motion of the main imaging data can be corrected without reconstruction.

The above description is for a method in which the imaging data is acquired by a parallel beam, but when the imaging data is acquired by a fan beam or a cone beam, the reference center position correction function cannot be determined as it is. Therefore, in the following, the modification points in the case where the imaging data is acquired by the fan beam are described.

The projection image of the projection data acquired when the optical system of CT apparatus is the fan beam optical system is not a projection image which strictly corresponds to the projection image at the opposing imaging angle due to the magnification ratio. Therefore, a fan-parallel conversion is performed to convert the projection image obtained by the fan beam method into a projection image of the parallel beam method. Further, the fan-parallel conversion for a projection image in which motion is present needs to be performed after the motion is corrected. Therefore, the fan-parallel conversion is performed at the following timing.

The process of generating the relative motion correction function and setting the temporary reference center position correction function can be performed in the same manner as described above. This is because the relative motion correction function is generated by comparing the projection image based on the reference imaging data with the projection image based on the main imaging data at the same imaging angle. In the case where the imaging data is data acquired by a fan beam or a cone beam and the X-ray intensity is normalized, the maximum value and the minimum value are preferably the maximum value and the minimum value of the histograms of the X-ray intensities for the whole of the main imaging data or the reference imaging data.

Figure 3A:
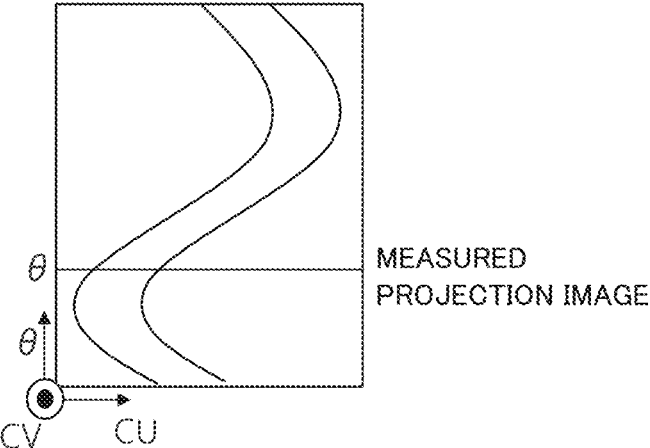
FIGS. 3A and 3B are schematic diagrams showing a sinogram of the actually measured projection images and a sinogram after the temporary correction and the fan-parallel conversion, respectively.
Figure 3B:
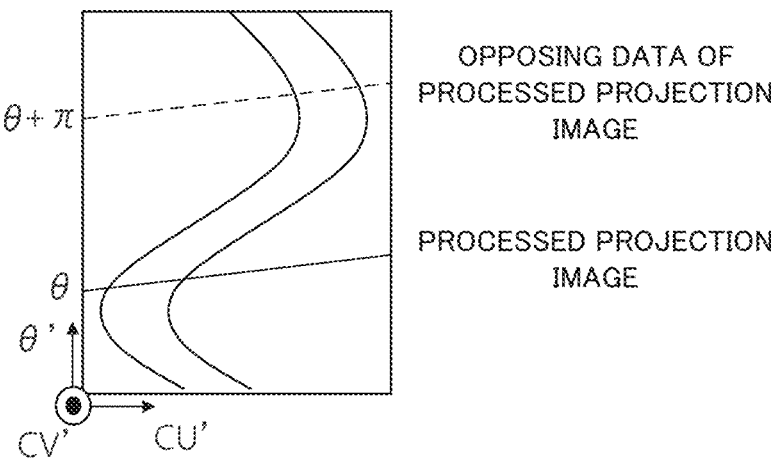

Next, a projection image based on the main imaging data temporarily corrected by the temporary reference center position correction function and the relative motion correction function is acquired, and the temporarily corrected projection image is fan-parallel converted. FIGS. 3A and 3B are schematic diagrams showing a sinogram of the actually measured projection images and a sinogram after the temporary correction and the fan-parallel conversion, respectively. FIG. 3A is a sinogram viewed in CU-θ plane before the fan-parallel conversion, and FIG. 3B shows a sinogram viewed in CU-θ plane after the temporary correction and the fan-parallel conversion. In FIG. 3B, the coordinates after the fan-parallel conversion are replaced with the coordinates of the virtual detection surface. Each pixel of the projection image at the angle θ in FIG. 3A corresponds to a pixel on a cross section represented by a straight line near the angle θ of the sinogram in FIG. 3B. The opposing positions of the pixels of the projection image after the fan-parallel conversion are on a cross section represented by a dotted line near the angle θ+π in FIG. 3B.

Since the coordinates are replaced in this manner, the converted data obtained by performing fan-parallel conversion on the projection image $P_{main}$ based on the main imaging data temporarily corrected by the temporary reference center position correction function center (θ), the relative motion correction function $x_{shift}(θ)$ and $y_{shift}(θ)$ is expressed as $P_p(x_p, y_p, θ_p;$ center (θ)). $P_p(x_p, y_p, θ_p;$ center (θ)) is expressed by the following formula (9). FanPara represents a function for performing fan-parallel conversion, and the $(x_p, y_p, θ_p)$ represents coordinates in a virtual detection surface after the fan-parallel conversion.

$$P_p(x_p,y_p,θ_p;\text{center}(θ))=\text{FanPara}(P_{main}(x+x_{shift}(θ)+\text{center}(θ),y+y_{shift}(θ),θ)) \qquad (9)$$

The reference center position correction function and the parameters of the temporary reference center position correction function based on the calculation of the degree of coincidence between a certain conversion data after the fan-parallel conversion and the conversion data at the angle opposing thereto can be determined, for example, by using the following formula (10). $P_p$ in the right side of formula (10) is $P_p$ in formula (9). The minus of the x-coordinate $x_p$ of the second term in the right side represents an inversion with respect to the center of the virtual detection surface after the fan-parallel conversion. That is, in the set temporary reference center position correction function center (θ), the projection image based on the temporarily corrected main imaging data is fan-parallel converted, and MSE is calculated for the converted data at an angle opposing to a certain converted data after the fan-parallel conversion. Then, the parameters of the temporary reference center position correction function center (θ) with the smallest MSE are obtained, and the parameters are used as the reference center position correction function.

$$\arg\min MSE(\text{center}(θ)) = \left[ \sum_{x_p,y_p,θ_p} \right. \qquad (10)$$

$$\left. (P_p(x_p, y_p, θ_p; \text{center}(θ)) - P_p(-x_p, y_p, θ_p + π, \text{center}(θ + π)))^2 \right]$$

Thus, by using the projection image that is temporarily corrected by the temporary reference center position correction function and the relative motion correction function and then fan-parallel converted, the reference center position correction function can be determined even when the imaging data is data obtained by the fan beam. Therefore, even when there is a motion derived from the rotation axis, it is possible to correct artifacts due to motion. That is, the present disclosure can also be applied to the case where the X-ray is a fan beam. Note that even when the X-ray is a cone beam, the cone beam can be regarded as a fan beam by setting a frame near the cross section of the center in the CV direction of the projection image, and thus the present disclosure can be applied.

[Entire System]

Figure 4:
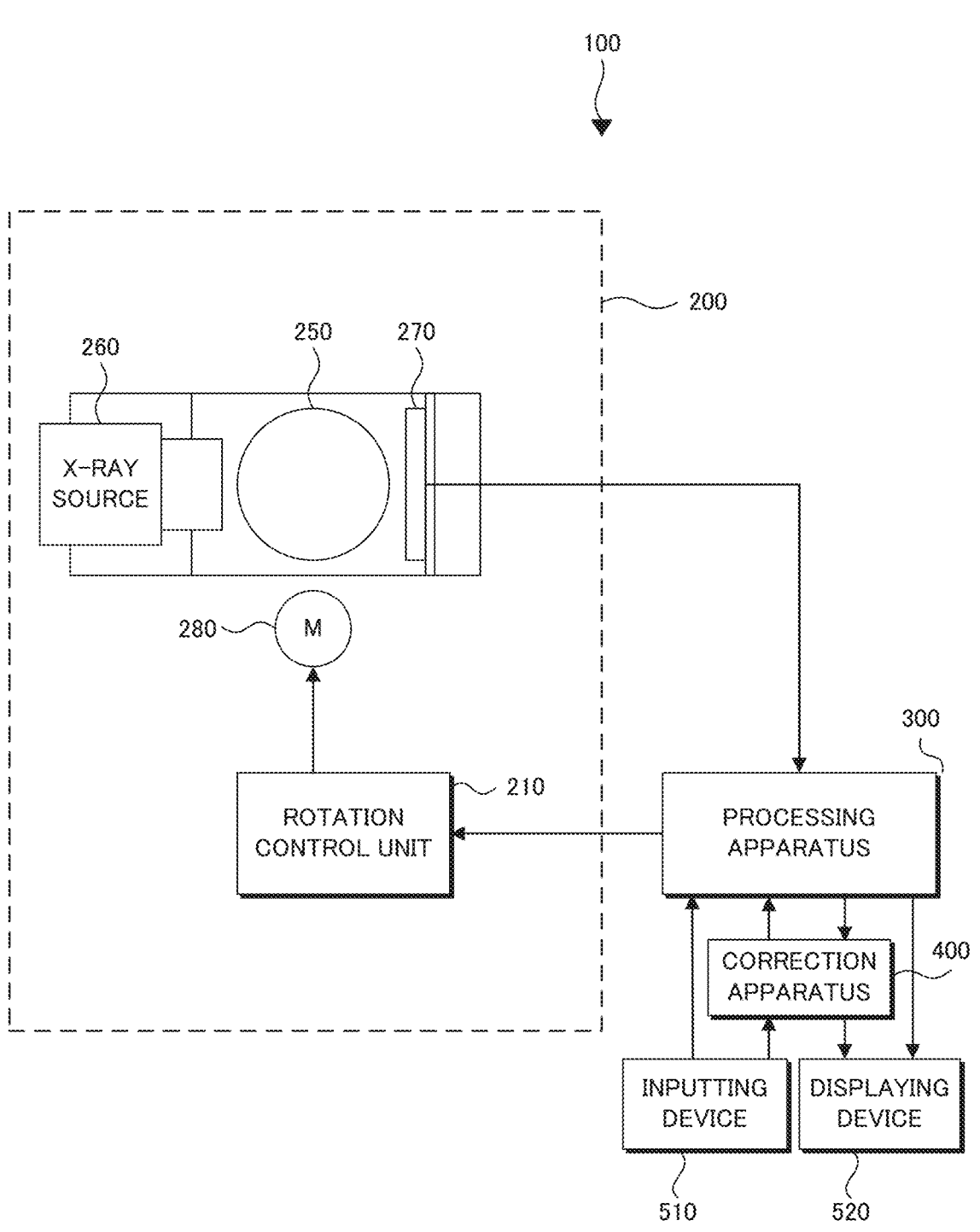
FIG. 4 is a schematic diagram showing an example of a configuration of the entire system.

FIG. 4 is a schematic diagram showing a configuration of an entire system 100 including a CT apparatus 200 and a processing apparatus 300, a correcting apparatus 400, an inputting device 510 and a displaying device 520 connected to the CT apparatus 200. Here, the CT apparatus 200 shown in FIG. 4 is configured to rotate the sample with respect to the X-ray source 260 and the detector 270, but the present disclosure is not limited to the configuration and may be configured to rotate the gantry in which the X-ray source and the detector are integrated. The CT apparatus 200 can be any apparatus that uses a parallel beam, a fan beam or a cone beam. However, in the case where the reference center position correction function is determined for any of the beams, it is necessary to perform 360° scanning.

The processing apparatus 300 is connected to CT apparatus 200 and performs control of CT apparatus 200 and processing of the acquired data. The correction apparatus 400 corrects the imaging data or the projection image. The processing apparatus 300 and the correction apparatus 400 may be PC terminals or servers on the cloud. The inputting device 510 is, for example, a keyboard or a mouse and performs input to the processing apparatus 300 or the correction apparatus 400. The displaying device 520 is, for example, a display, and displays imaging data, a projection image, and the like.

Figure 5:
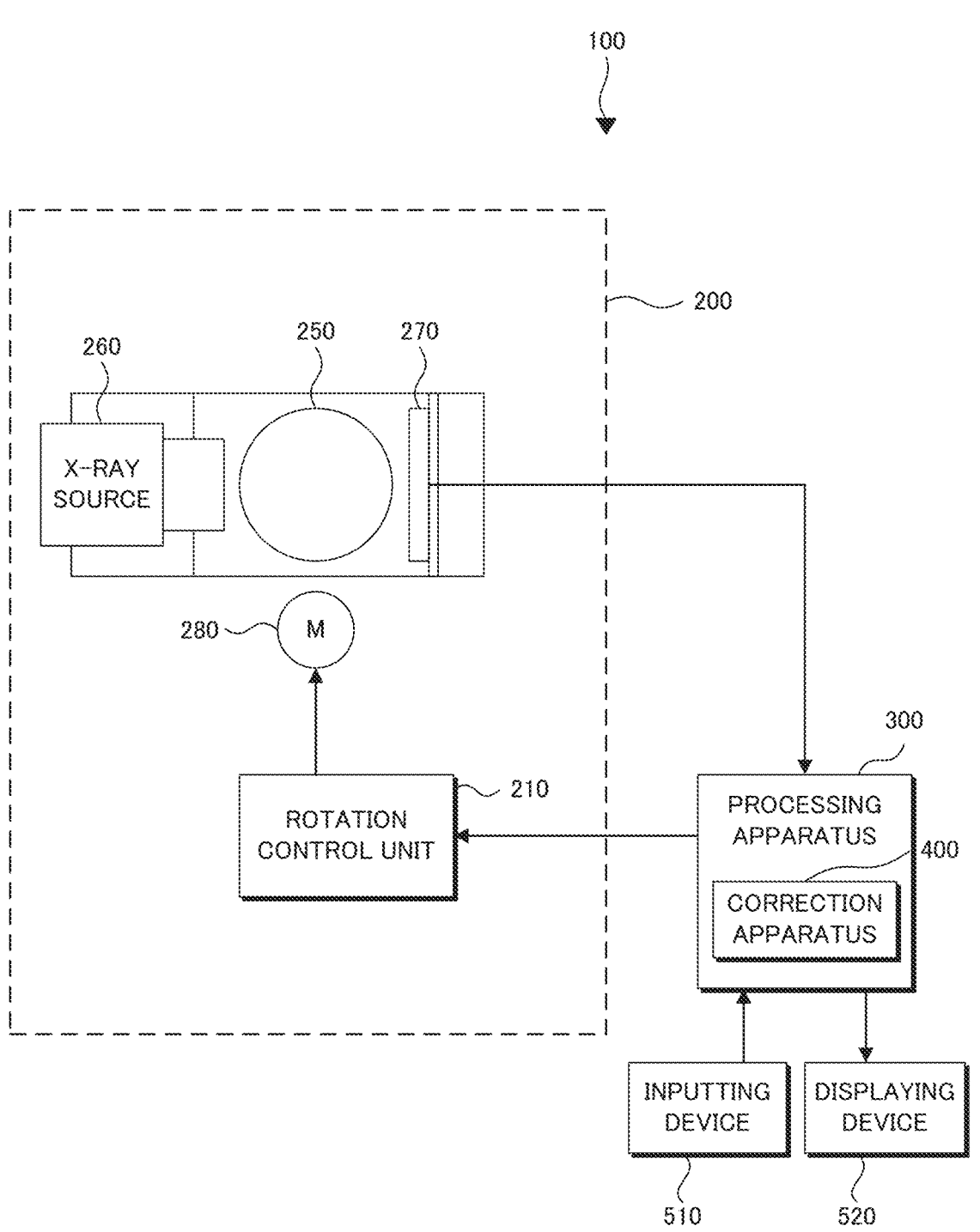
FIG. 5 is a schematic diagram showing a modified example of a configuration of the entire system.

Note that, in FIG. 4, the processing apparatus 300 and the correction apparatus 400 are displayed as separate components in order to emphasize the correction function of the correction apparatus 400, but as shown in FIG. 5, the correction apparatus 400 may be configured as a part of the function included in the processing apparatus 300, or the correction apparatus 400 and the processing apparatus 300 may be configured as an integral unit. FIG. 5 is a schematic diagram showing a modified example of a configuration of the entire system. By using such a system, the cost for correcting artifacts due to motion in the reconstruction of CT images can be reduced.

[CT Apparatus]

As shown in FIG. 4, the CT apparatus 200 includes a rotation control unit 210, a sample stage 250, an X-ray source 260, a detector 270 and a driving section 280. X-ray CT is performed by rotating the sample stage 250 installed between the X-ray source 260 and the detector 270. Note that the X-ray source 260 and the detector 270 may be installed on a gantry, and the gantry may be rotated with respect to a sample fixed to the sample stage 250.

CT apparatus 200 drives the sample stage 250 at a timing instructed by the processing apparatus 300 to acquire imaging data of the sample. The imaging data is transmitted to the processing apparatus 300. The CT apparatus 200 is suitable for use in precision industrial products such as semiconductor apparatuses, however, can be applied to an apparatus for animals as well as an apparatus for industrial products.

The X-ray source 260 emits X-rays toward the detector 270. The detector 270 has a receiving surface for receiving X-rays, and can measure the intensity distribution of X-rays transmitted through the sample by a large number of pixels. The rotation control unit 210 rotates the sample stage 250 at a speed set at the time of CT measurement by the driving section 280.

[Processing Apparatus]

Figure 6:
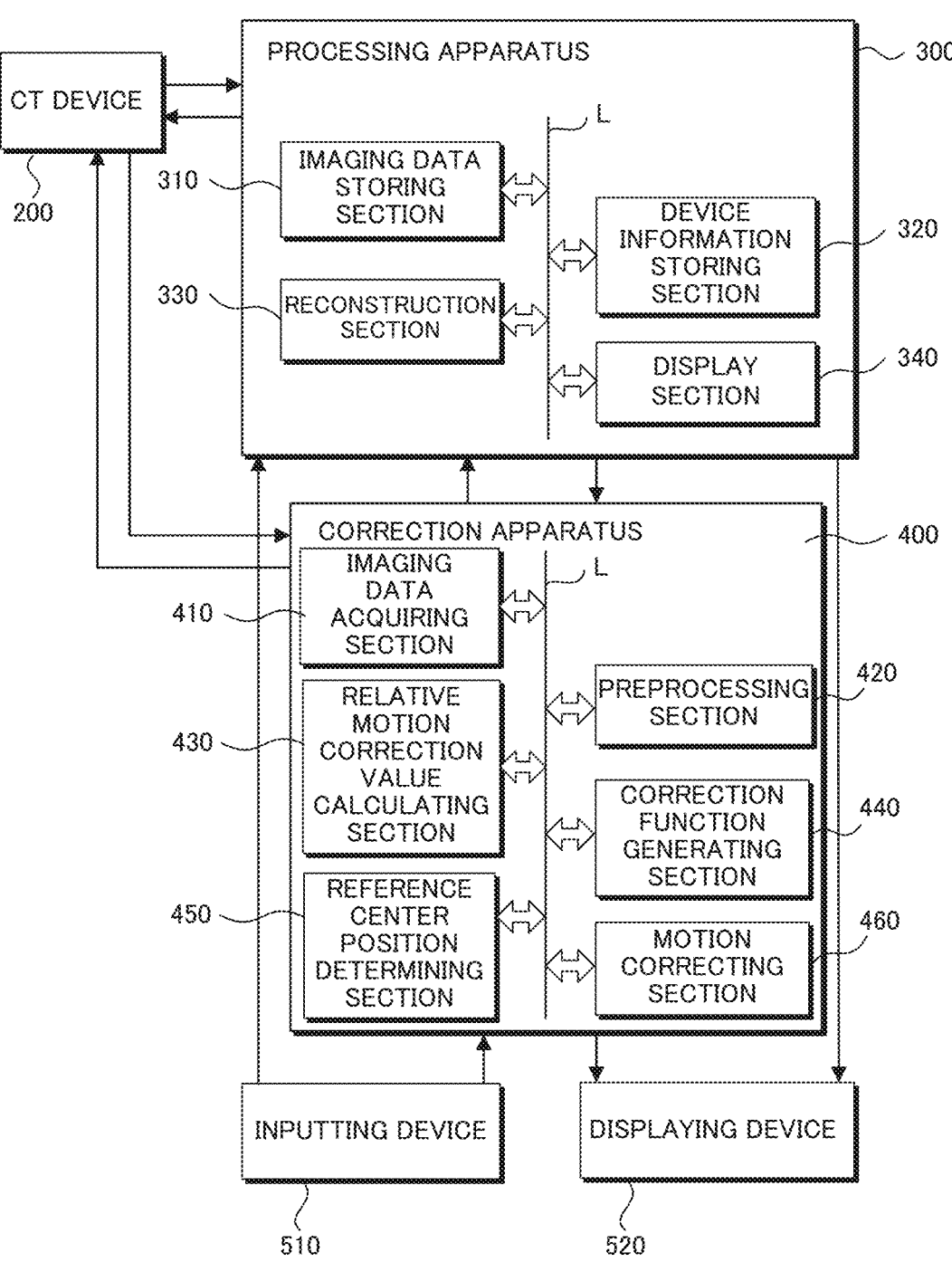
FIG. 6 is a block diagram showing one example of a configuration of the processing apparatus and the correction apparatus.

FIG. 6 is a block diagram showing a configuration of the processing apparatus 300 and the correction apparatus 400. The processing apparatus 300 is configured by a computer formed by connecting a CPU (Central Processing Unit), a ROM (Read Only Memory), a RAM (Random Access Memory), and a memory to a bus. The processing apparatus 300 is connected to the CT apparatus 200 and receives information.

The processing apparatus 300 includes an imaging data storing section 310, a apparatus information storing section 320, a reconstruction section 330, and a display section 340. Each section can transmit and receive information via the control bus L. The input device 510 and the display device 520 are connected to CPU via an appropriate interface.

The imaging data storing section 310 stores imaging data acquired from CT apparatus 200. The imaging data includes main imaging data and reference imaging data. The main imaging data and the reference imaging data include rotation angle information and the X-ray intensity detected in each pixel of the detector at the time of the rotation angle. The apparatus information storing section 320 stores apparatus information acquired from the CT apparatus 200. The apparatus information includes apparatus name, beam shape, geometry at the time of measurement, scanning method, etc.

The reconstruction section 330 reconstructs CT images from the imaging data. The display section 340 causes the displaying device 520 to display the reconstructed CT images, the imaging data before and after the correction, the projection image, or the feature extracted projection image. Thus, the user can confirm the CT image based on the corrected imaging data, the imaging data before and after the correction, the projection image or the feature extracted projection image. In addition, the user can instruct and designate the processing apparatus 300, the correction apparatus 400, and the like based on the CT image, the imaging data before and after the correction, the projection image or the feature extracted projection image.

[Correction Apparatus]

Figure 7:
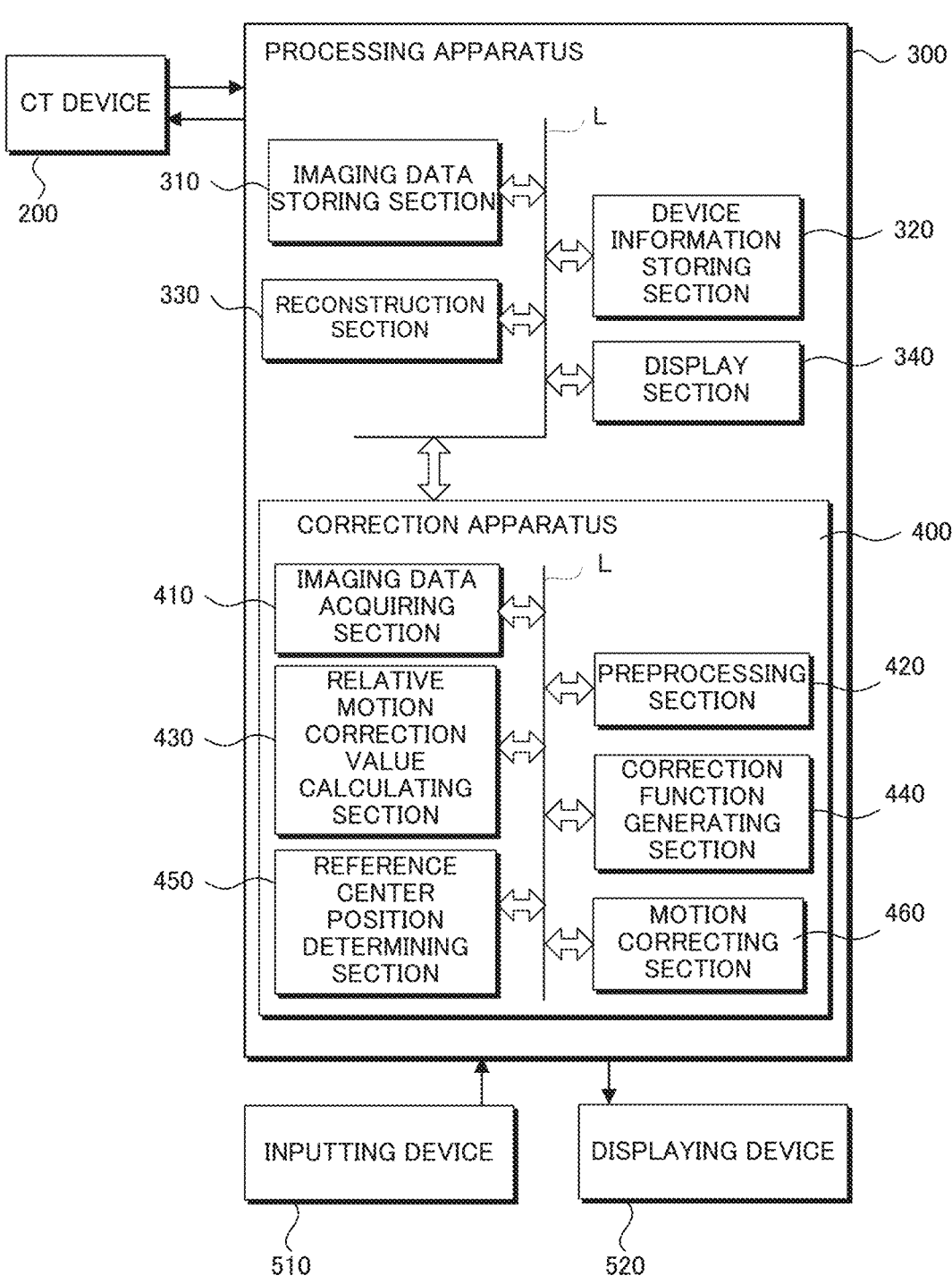
FIG. 7 is a block diagram showing a modified example of a configuration of the processing apparatus and the correction apparatus.
Figure 8:
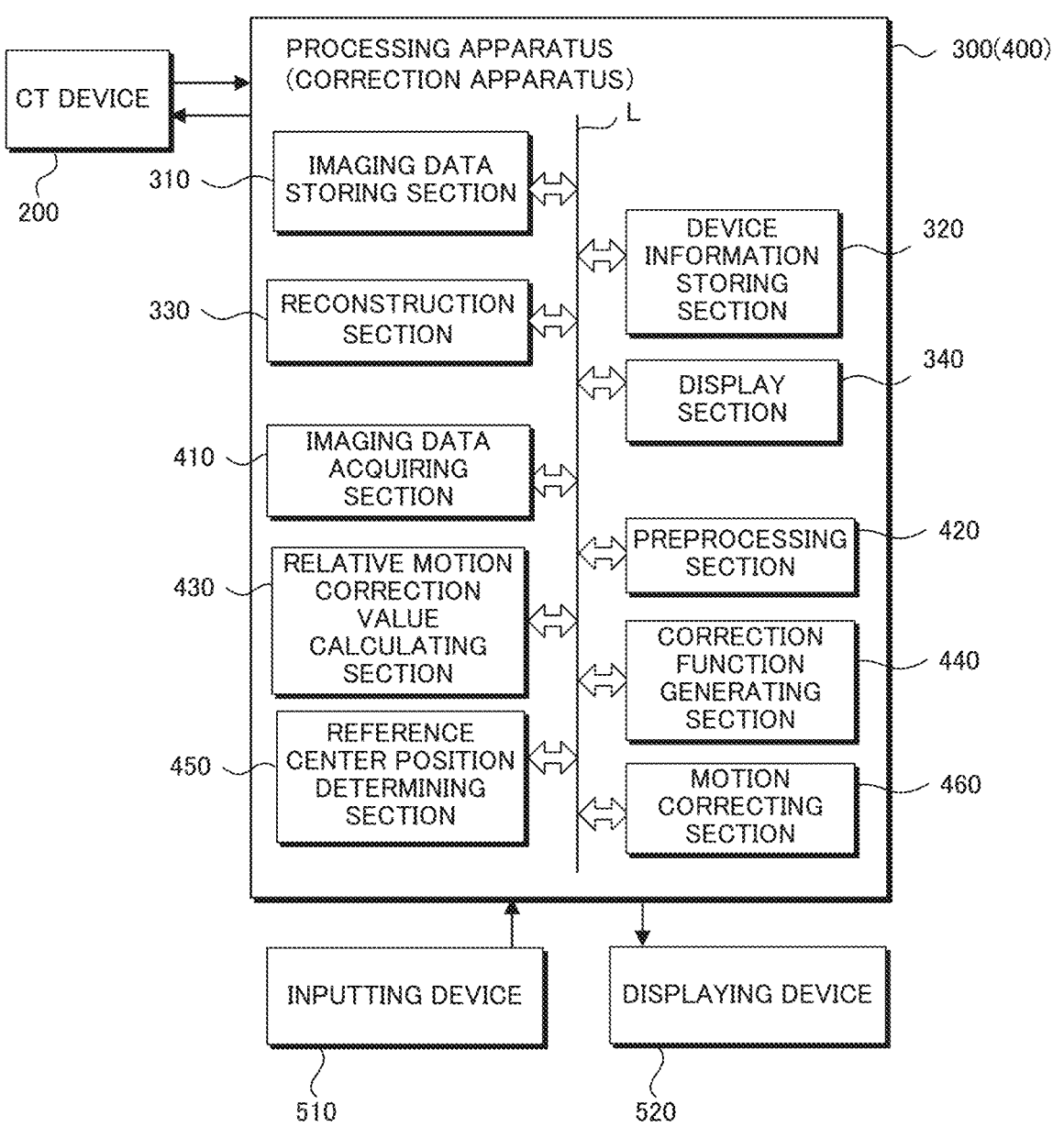
FIG. 8 is a block diagram showing a modified example of a configuration of the processing apparatus and the correction apparatus.

The correction apparatus 400 is configured from a computer formed by connecting CPU, ROM, RAM and a memory to a bus. The correcting apparatus 400 may be directly connected to the CT apparatus 200 or may be connected to CT apparatus 200 via the processing apparatus 300. In addition, the correcting apparatus 400 may receive information from the CT apparatus 200 or may receive information from the processing apparatus 300. Note that, as illustrated in FIG. 7, the correction apparatus 400 may be configured as a part of the functions included in the processing apparatus 300, or as illustrated in FIG. 8, the correction apparatus 400 and the processing apparatus 300 may be configured as an integral unit. In addition, the correction apparatus 400 may include a part of the function of the processing apparatus 300.

The correction apparatus 400 comprises an imaging data acquiring section 410, a preprocessing section 420, a relative motion correction value calculating section 430, a correction function generating section 440, a reference center position determining section 450, and a motion correcting section 460. Each section can transmit and receive information via the control bus L. When the correction apparatus 400 and the processing apparatus 300 have different configurations, the inputting device 510 and the displaying device 520 are also connected to CPU of the correction apparatus 400 via an appropriate interface. In this case, the inputting device 510 and the displaying device 520 may be different from those connected to the processing apparatus 300.

The imaging data acquiring section 410 acquires the main imaging data and the reference imaging data from the CT apparatus 200 or the processing apparatus 300. The main imaging data and the reference imaging data may be data obtained by any of a parallel beam, a fan beam and a cone beam.

The preprocessing section 420 converts the main imaging data and the reference imaging data into projection images. Preferably, the preprocessing section 420 normalizes the X-ray intensity of the main imaging data or the reference imaging data, and generates a feature extracted projection image in which features are extracted from the normalized main imaging data or the projection image based on the reference imaging data. At this time, it is preferable that the preprocessing section 420 performs noise removal before extracting the feature.

The relative motion correction value calculating section 430 aligns the projection image based on the reference imaging data and the projection image based on the main imaging data corresponding to the imaging angle of the reference imaging data and calculates the relative motion correction value for each imaging angle.

When the preprocessing section 420 generates the feature extracted projection image, the relative motion correction value calculating section 430 preferably calculates the relative motion correction value based on the feature extracted projection image of the reference imaging data and the feature extracted projection image of the main imaging data corresponding to the feature extracted projection image of the reference imaging data.

The correction function generating section 440 generates a relative motion correction function that corrects the relative motion of all the main imaging data or all the projection image based on the main imaging data based on the relative motion correction value calculated by the relative motion correction value calculating section 430.

The relative motion correction function is preferably a polynomial of order determined based on the number of frames of reference imaging data. When the relative motion correction function is a polynomial, the order of the relative motion correction function is preferably ½ or less of the number of frames of reference imaging data. The function shape and the order of the relative motion correction function may be set by the user. In addition, the computer may automatically set the number of images based on the number of frames of reference imaging data. Further, it may be predetermined.

The reference center position determining section 450 sets a temporary reference center position correction function. In addition, the reference center position determining section 450 determines the reference center position correction function and the parameters of the temporary reference center position correction function. The reference center position determining section 450 acquires the temporarily corrected projection image and determines the reference center position correction function and the parameters of the temporary reference center position correction function by calculating the degree of coincidence between the temporarily corrected projection image and the projection image at the imaging angle opposing to the temporarily corrected projection image.

The main imaging data and the reference imaging data may be data acquired by a cone beam or a fan beam. In this case, the preprocessing section 420 or other components of the correction apparatus 400 may have a function of performing the fan-parallel conversion. Further, the fan-parallel conversion section may be provided separately. It is preferable that the reference center position determining section 450 determines parameters of the temporary reference center position correction function by obtaining the conversion data obtained by performing fan-parallel conversion on the temporarily corrected projection image and calculating the degree of coincidence between the conversion data and the conversion data at the angle opposing thereto.

The motion correcting section 460 temporarily corrects the main imaging data or the projection image based on the main imaging data by using the temporary reference center position correction function and the relative motion correction function. In addition, the motion correcting section 460 corrects the main imaging data or the projection image based on the main imaging data using the reference center position correction function and the relative motion correction function. Thus, the absolute motion can be corrected using the reference center position correction function and the relative motion correction function. The corrected main imaging data or projection image is finally outputted to the reconstruction section 330 and converted into CT images.

In a case where the preprocessing section 420 generates the feature extracted projection image, the motion correcting section 460 preferably temporarily corrects the feature extracted projection image based on the main imaging data with the temporary reference center position correction function and the relative motion correction function. Further, in this case, it is preferable that the reference center position determining section 450 determines the parameters of the temporary reference center position correction function by acquiring the temporarily corrected feature extracted projection image and calculating the degree of coincidence between the temporarily corrected feature extracted projection image and the feature extracted projection image at the imaging angle opposing to the temporarily corrected feature extracted projection image.

The calculation of the relative motion correction value is preferably performed based on a partial region of the projection image. The parameters of the temporary reference center position correction function are preferably determined based on a partial region of the temporarily corrected projection image. Thus, the calculation cost can be reduced. The setting of a partial region of the projection image may be performed by the user. For example, the region can be set by specifying the widths in the x-axis direction and the y-axis direction and the center position of the frame. In addition, a configuration may be adopted in which the computer automatically determines the setting based on the characteristic structure. Further, it may be predetermined.

Figure 9A:
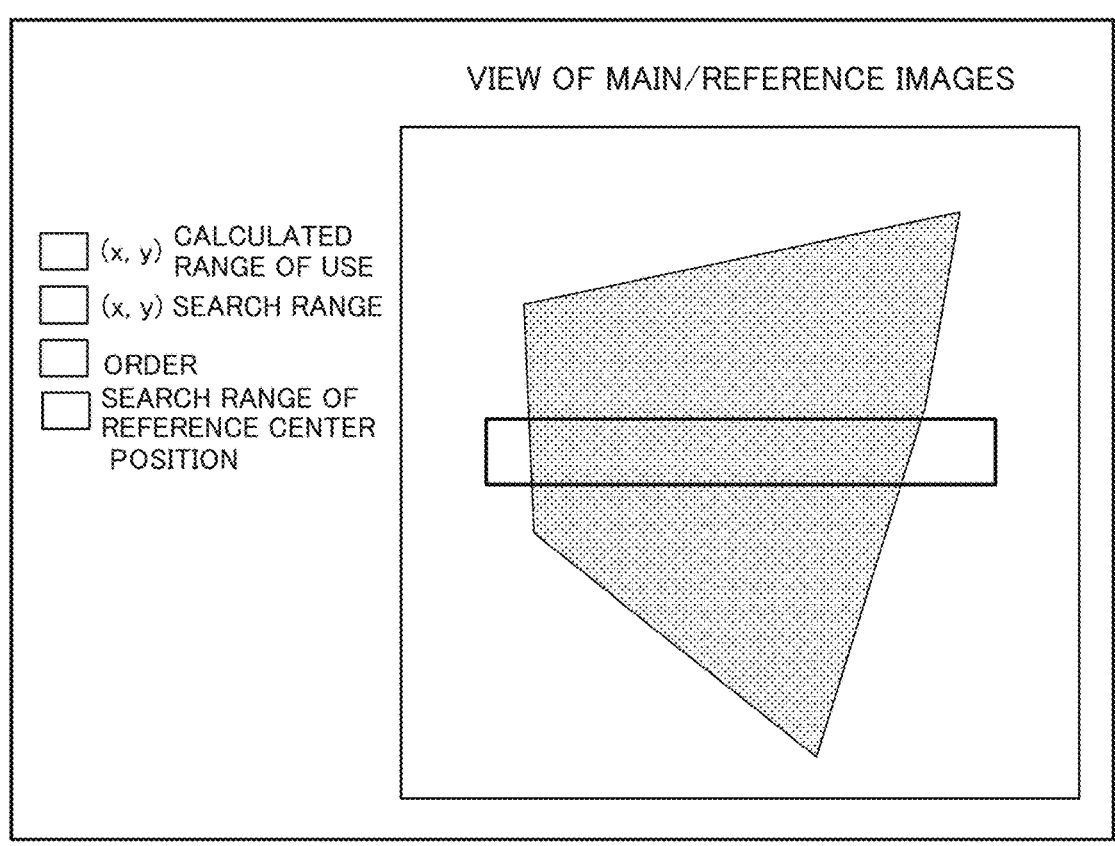
FIG. 9A is a conceptual diagram showing an example of a UI when a user provides various settings.
Figure 9B:
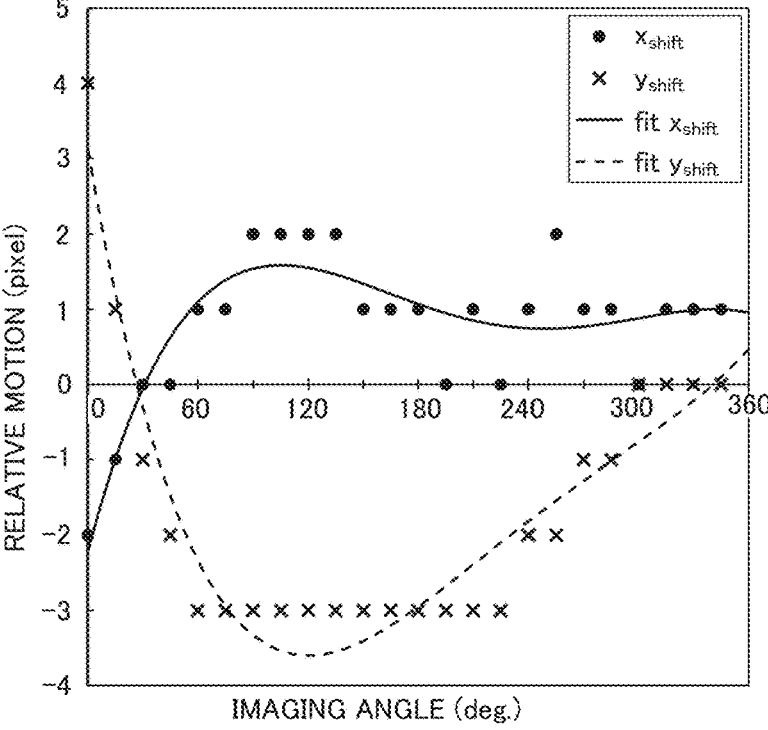
FIG. 9B is a graph showing an example of a result of a polynomial interpolation.

When the above-described setting is designated by the user, for example, it is preferable to use a UI function capable of performing various settings by operation of a mouse or a keyboard. FIG. 9A is a conceptual diagram showing an exemplary UI when the user provides various settings. FIG. 9B is a graph showing an example of a result of a polynomial interpolation. In FIG. 9A, for example, on the display screen of certain reference imaging data or projection image displayed on the right side of the screen, a frame can be set for calculating the degree of coincidence with the image of the corresponding main imaging data or projection image. Further, on the display screen of certain imaging data or projected image displayed on the right side of the screen, a frame can be set for calculating the degree of coincidence with the opposing imaging data or projected image.

In an example of FIG. 9A, the (x, y) usage range for calculation may set an image range to be used to calculate the relative motion correction values or determine the reference center position. The (x, y) usage range for calculation corresponds to the frame of the image View. The (x, y) search range can set the maximum amount of image movement of the imaging data or the projection up, down, left and right. As the order, the order of polynomial interpolation of the relative motion correction function can be set. As the search range of the reference center position, the search range of the x-direction alignment of the data at the opposing angles can be set. UI function may have a function of displaying the calculation result. The display function of the calculation result can be set so that the result of the alignment calculation or the polynomial interpolation is visually displayed, for example, as shown in FIG. 9B. Note that the setting items displayed in FIG. 9A are exemplary, and even when the user sets them, only a part of them may be set, or all of them may be set. In addition, there may be setting items that are not displayed in FIG. 9A or 9B.

[Measurement Method]

A sample is placed in CT apparatus 200, and the moving of the rotating shaft and the projection of the X-ray are repeated under a predetermined condition, and thereby main imaging data or reference imaging data are acquired while the X-ray is irradiated to the sample. The CT apparatus 200 transmits the apparatus information such as the scanning method and the acquired main imaging data or reference imaging data as the imaging data to the processing apparatus 300 or the correction apparatus 400.

[Correction Method]

(Description of Flow for Parallel Beam)

Figure 10:
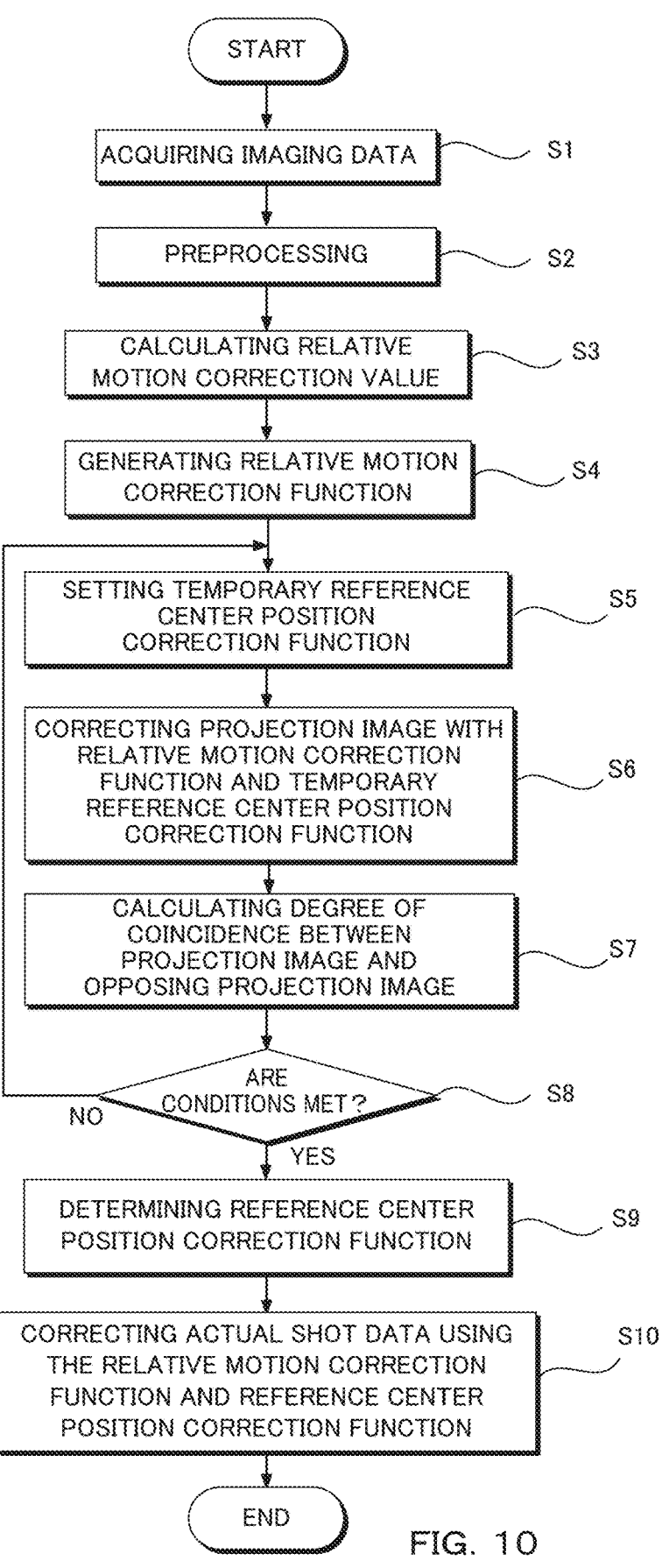
FIG. 10 is a flowchart showing an example of an operation of the correction apparatus.

FIG. 10 is a flowchart showing an example of an operation of the correction apparatus 400. First, the correction apparatus 400 acquires imaging data (step S1). Next, preprocessing is performed (step S2). Next, the relative motion correction values are calculated (step S3) In each imaging angle of the reference imaging data, the movement amounts in the x-axis direction and the y-axis direction in which the degree of coincidence between the projection image based on the reference imaging data and the projection image based on the main imaging data at the same imaging angle as the projection image based on the reference imaging data is maximized are set as relative motion correction values. When a frame is set in the projection image, the degree of coincidence is calculated only in the region within the frame. Next, a relative motion correction function is generated (step S4). The order of the relative motion correction function is preferably set to be ½ or less of the number of frames of reference data.

Next, the temporary reference center position correction function is set (step S5). Next, the projection image based on the main imaging data is temporarily corrected by the relative motion correction function and the temporary reference center position correction function (step S6). Next, the degree of coincidence between a certain temporarily corrected projection image and a projection image at an opposing angle is calculated (step S7).

If the set condition is not satisfied (step S8—NO), the process returns to step S5, another temporary reference center position correction function is set, and the process up to step S7 is performed again. On the other hand, if the set condition is satisfied (step S8—YES), then the reference center position correction function and the parameters of the temporary reference center position correction function are determined (step S9). Then, the main imaging data or the projection image based on the main imaging data is corrected using the relative motion correction function and the determined reference center position correction function (step S10). In this way, the main imaging data or the projection image can be corrected. Note that the condition of the step S8 can be set as a condition that the parameters of the temporary reference center position correction function have been exhaustively calculated within the set range, that the total value of the degree of coincidence calculated for a certain temporary reference center position satisfies a predetermined threshold, that the total value of the degree of coincidence calculated for a certain temporary reference center position is an extreme value, or the like. In addition, for the relative motion correction function, for example, a plurality of orders may be set, and steps 4 to 9 may be executed to adopt the order having the highest degree of coincidence in the step S8. This enables a more sophisticated estimation of absolute motion.

(Description of Flow for Fan Beam or Cone Beam)

FIG. 11 is a flowchart showing a modified example of an operation of the correction apparatus 400. FIG. 11 shows an example of an operation performed when imaging data acquired with a fan beam or a cone beam is corrected. First, the correction apparatus 400 acquires imaging data (step T1). Next, preprocessing is performed (step T2). Next, the relative motion correction value is calculated (step T3). Next, a relative motion correction function is generated (step T4).

Next, the temporary reference center position correction function is set (step T5). Next, the projection image based on the main imaging data is temporarily corrected by the relative motion correction function and the temporary reference center position correction function (step T6). Next, the temporarily corrected projection image is fan-parallel converted (step T7). Next, the degree of coincidence between the converted data after the fan-parallel conversion and the converted data at the opposing angle is calculated (step T8).

If the set condition is not satisfied (step T9—NO), the process returns to step T5, another temporary reference center position correction function is set, and the process up to step T7 is performed again. On the other hand, if the set condition is satisfied (step T9—YES), then the reference center position correction function and the parameters of the temporary reference center position correction function are determined (step T10). Then, the main imaging data or the projection image based on the main imaging data is corrected using the relative motion correction function and the determined reference center position correction function (step T11). In this way, the main imaging data or the projection image can be corrected. Note that the condition of the step T9 can be set as a condition that the parameters of the temporary reference center position correction function have been exhaustively calculated within the set range, that the total value of the degree of coincidence calculated for a certain temporary reference center position satisfies a predetermined threshold, that the total value of the degree of coincidence calculated for a certain temporary reference center position is an extreme value, or the like.

[Correction and Reconfiguration Method]

The flowcharts of FIGS. 10 and 11 show the operation of only the correction apparatus 400. Although this is sufficient as the correction of the main imaging data or the projection image, the operation including the imaging and the reconstruction of the main imaging data is also described in order to clarify the difference from the prior art.

Figure 12:
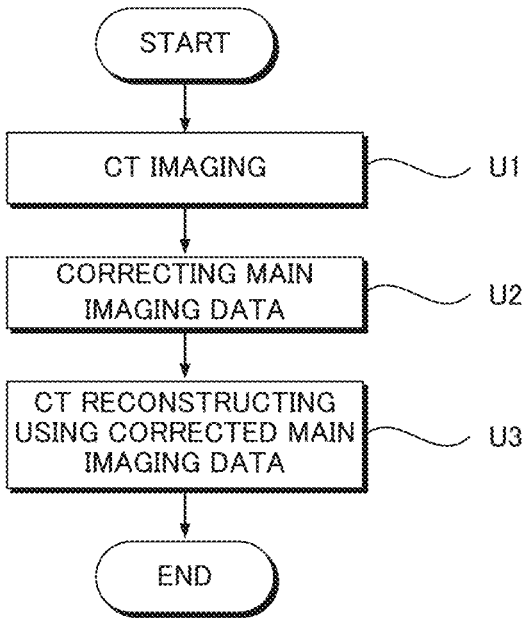
FIG. 12 is a flowchart showing an example of the operation of the system.

FIG. 12 is a flowchart showing an example of the operation of the system 100. First, the CT apparatus 200 performs CT imaging (step U1). The CT imaging includes repeated a movement of the rotational axis and a projection of the X-rays. Next, the main imaging data or the projection image based on the main imaging data is corrected (step U2). As the flow of correcting the main imaging data or the projection image based on the main imaging data, for example, one of the flows of FIG. 10 or FIG. 11 may be adopted depending on the type of the optical system of the acquired projection image. Further, the optical system may be determined from the apparatus information so that an appropriate flow can be selected. Then, the processing apparatus 300 or the correction apparatus 400 reconstructs a CT image using the corrected main imaging data or the projection images based on the corrected main imaging data (step U3). In this way, it is possible to obtain a reconstructed CT image using the corrected main imaging data or the projection image based on the corrected main imaging data.

In the description of the related art, for example, the reconstruction of CT images and the correction for artifact reduction have been repeated. In contrast, according to the present disclosure, the correction for artifact reduction is performed on a projection image before reconstruction. Thereby, the cost for correction can be reduced. In addition, it is possible to correct not only the relative motion but also the motion derived from the rotation axis.

Example 1

Figure 13A:
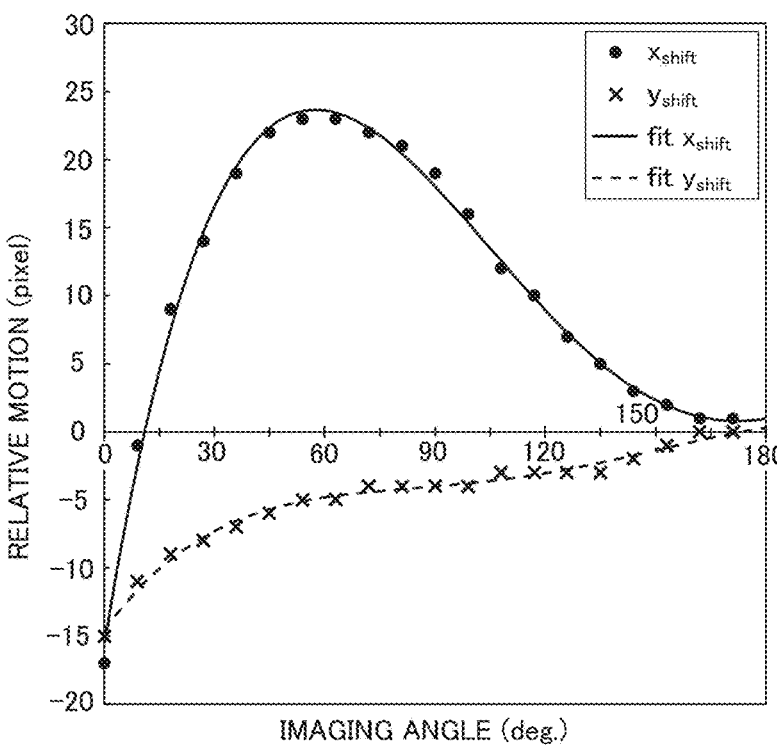
FIGS. 13A and 13B are graphs of the relative motion correction function and a result of determining the reference center position of the sample 1, respectively.
Figure 13B:
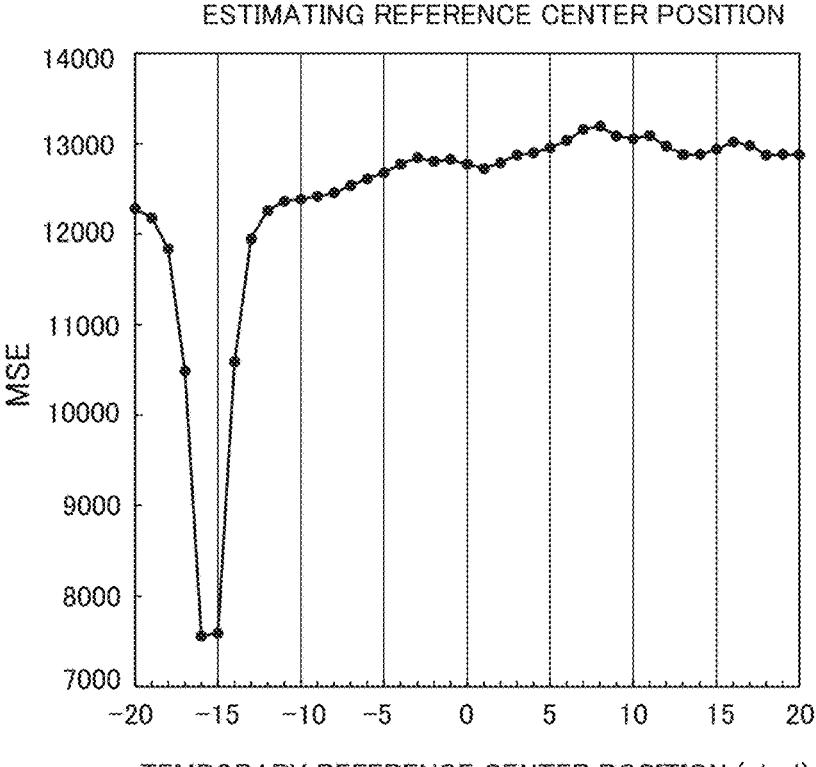
Figure 14A:
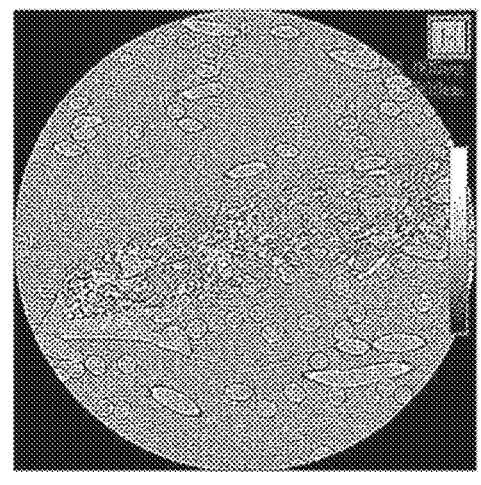
FIGS. 14A to 14C are certain cross sections showing CT images of the sample 1 reconstructed using the corrected main imaging data, respectively.
Figure 14D:
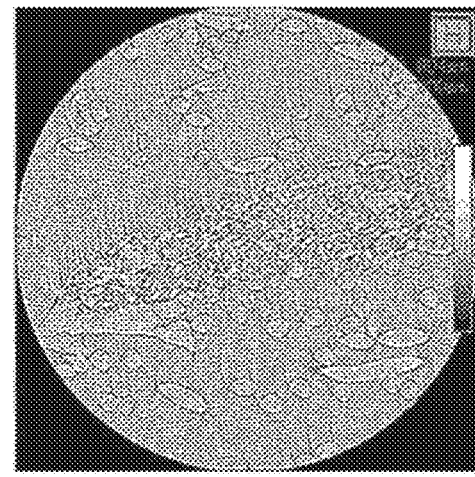
FIGS. 14D to 14F are the same cross sections of CT images of the sample 1 reconstructed using the uncorrected main imaging data, respectively.
Figure 14B:
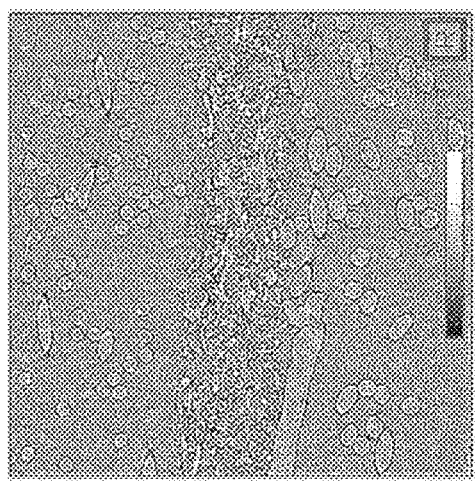
Figure 14E:
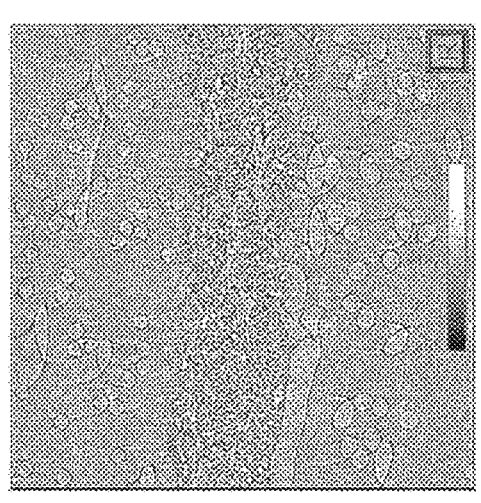
Figure 14C:
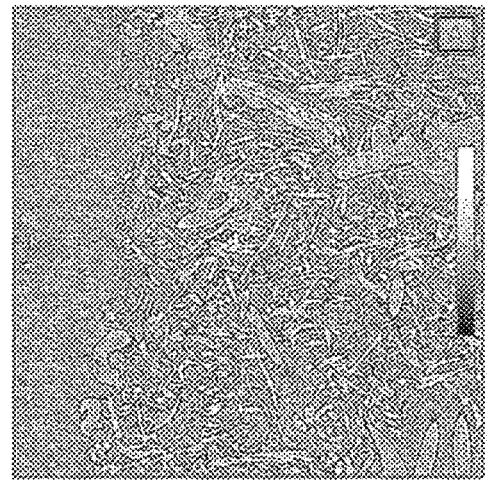
Figure 14F:
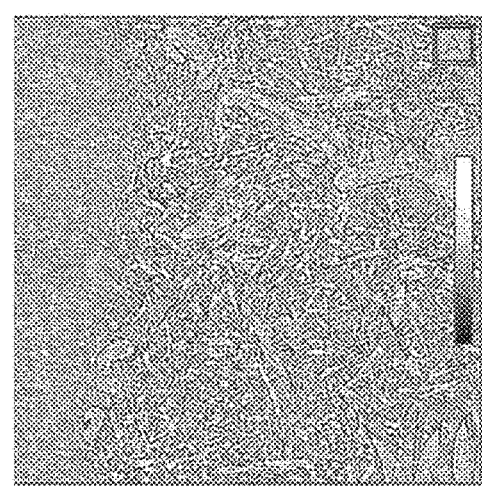

The nonwoven fabric (Sample 1) was observed using the system 100 configured as described above. Rigaku nano 3DX (pseudo-parallel-beam optical system) was used as the CT apparatus 200 for the measurement. FIGS. 13A and 13B are diagrams showing the relative motion correction function of the sample 1 determined by the present methods and the result of determining the reference center position, respectively. FIG. 13A shows relative the motion correction values in x, y direction and the relative motion correction functions. FIG. 13B shows the set temporary reference center position and the value of MSE at that time and is the position where the value of MSE is the smallest is the determined reference center position. FIGS. 14A to 14F show certain cross sections of CT image of the sample 1 reconstructed using the main imaging data that was corrected and the same cross sections of CT image of the sample 1 reconstructed using the main imaging data that was not corrected. FIGS. 14A to 14C show corrected, and FIGS. 14D to 14F show not corrected. The reconstruction was performed using FDK method.

The reference center position determined by the present method is −16 pixel, and the same value as the reference value (the center position obtained from the sequential calculation of the slice reconstruction) was able to be calculated. That is, it was confirmed that the method of the present disclosure can accurately determine the reference center position in a short time without using reconstruction. Further, by comparing FIGS. 14A to 14C and FIGS. 14D to 14F, it is found that artifacts are reduced by the correction of the present methods.

Example 2

Figure 15A:
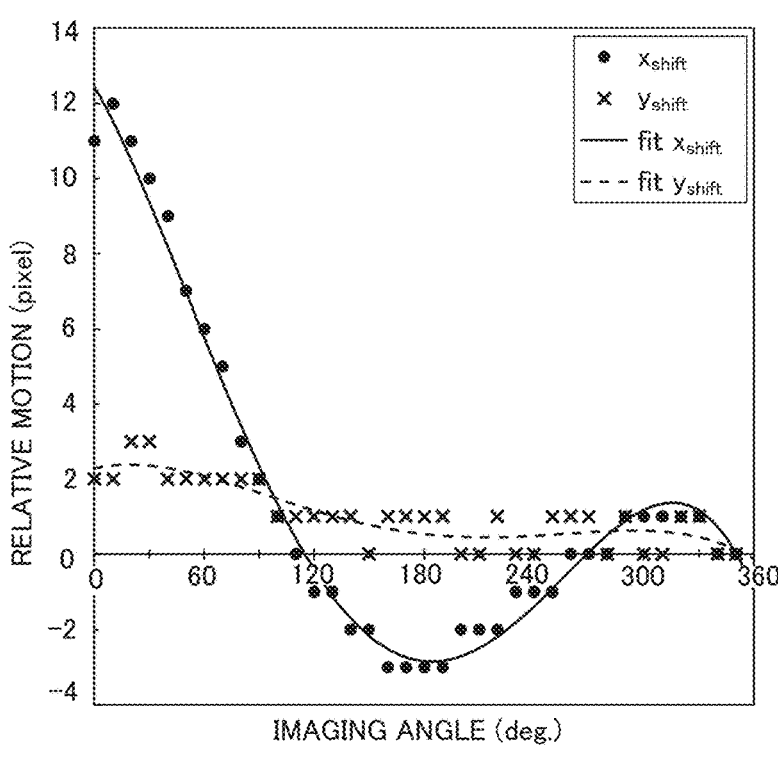
FIGS. 15A and 15B are graphs of the relative motion correction function and a result of determining the reference center position of the sample 2, respectively.
Figure 15B:
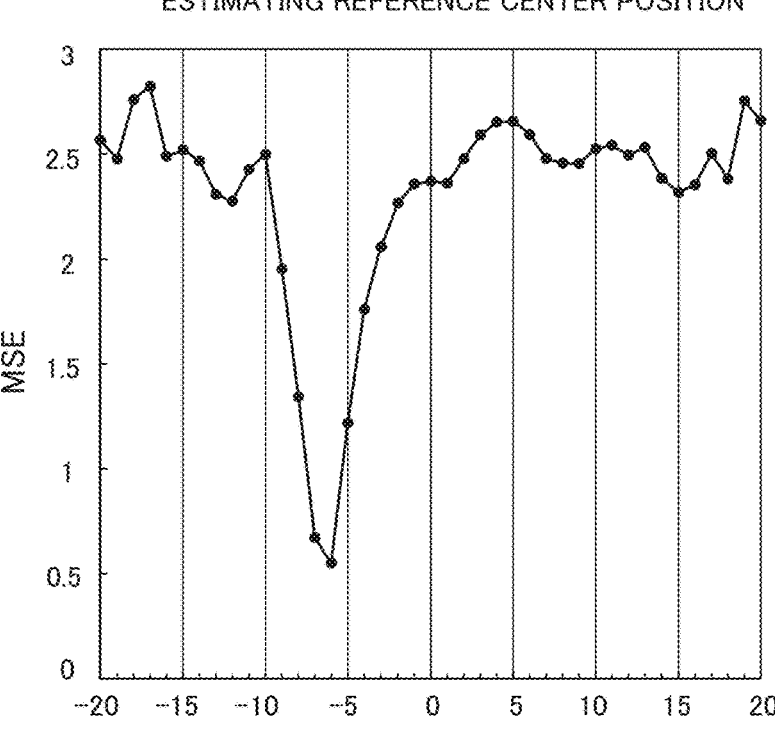
Figure 16A:
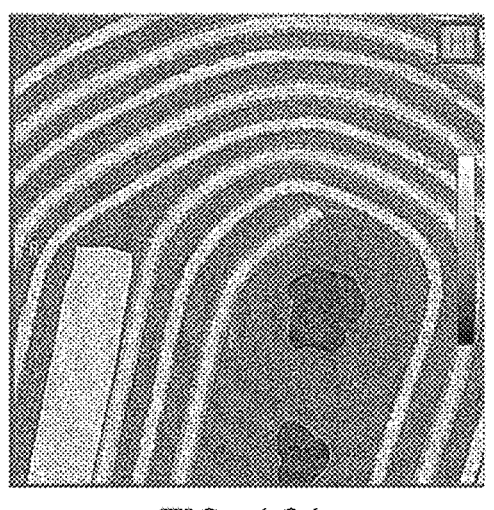
FIGS. 16A, 16B, and 16C are certain cross sections showing CT images of the sample 2 reconstructed using the corrected main imaging data, respectively.
Figure 16D:
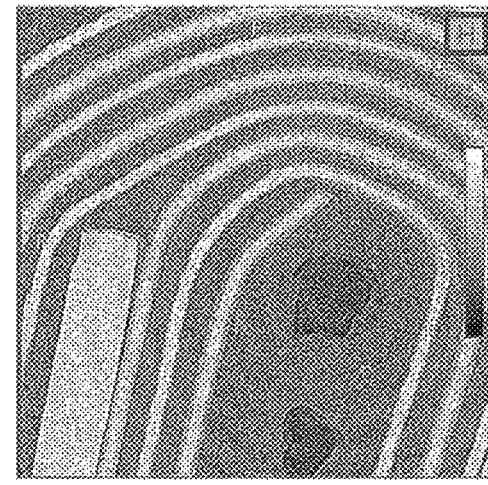
FIGS. 16D, 16E, and 16F are the same cross sections of CT images of the sample 2 reconstructed using the uncorrected main imaging data, respectively.
Figure 16B:
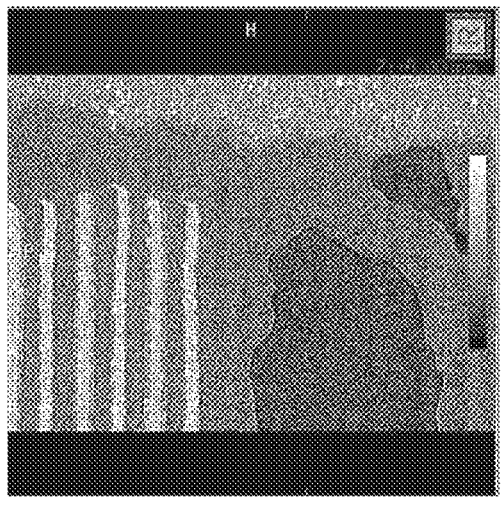
Figure 16E:
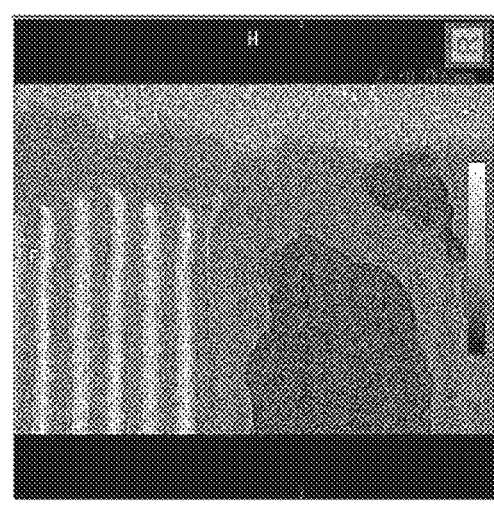
Figure 16C:
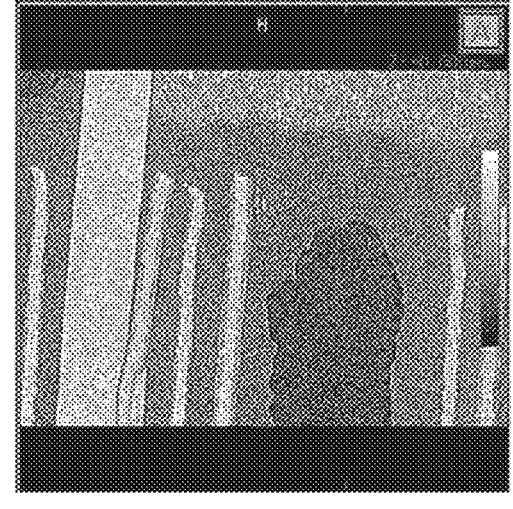
Figure 16F:
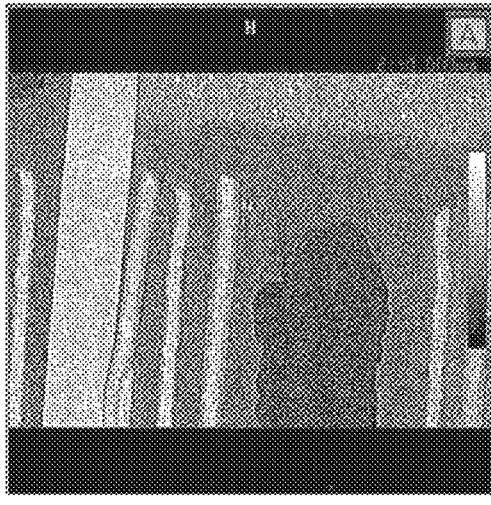

Next, a capacitor (Sample 2) was observed. A CT apparatus with a cone-beam optical system made by Rigaku was used as the CT apparatus 200 for the measurement. FIGS. 15A and 15B are diagrams showing the relative motion correction function of the sample 2 determined by the present methods and the result of determining the reference center position, respectively. FIG. 15A shows relative the motion correction values in x, y direction and the relative motion correction functions. FIG. 15B shows the set temporary reference center position and the value of MSE at that time and is the position where the value of MSE is the smallest is the determined reference center position. FIGS. 16A to 16F show certain cross sections of CT image of the sample 2 reconstructed using the main imaging data that was corrected and the same cross sections of CT image of the sample 2 reconstructed using the main imaging data that was not corrected. FIGS. 16A to 16C show corrected, and FIGS. 16D to 16F show not corrected. FDK method was used for the reconstitution as for sample 1.

The reference center position determined by the present method is −6 pixel, and the same value as the reference value (the center position obtained from the sequential calculation of the slice reconstruction) was able to be calculated. That is, it has been confirmed that the method of the present disclosure can accurately determine the reference center position in a short time even in the case of the imaging data obtained with a cone beam and without using the reconstruction. Further, by comparing FIGS. 16A to 16C and FIGS. 16D from 16F, it is found that artifacts are reduced by the correction of the present methods. It was confirmed that the correction method of the present disclosure can also be applied to imaging data measured by a cone beam or a fan beam.

It has been confirmed that the correction apparatus, system, method and program of the present disclosure can effectively correct artifacts due to motion in the reconstruction of CT images and reduce calculation cost.

What is claimed is:

1. A correction apparatus for correcting artifacts due to motion during CT image measurement, comprising:
   processing circuitry configured to
   acquire main imaging data scanned by 360° and reference imaging data,
   convert the main imaging data and the reference imaging data into projection images,
   align the projection image based on the reference imaging data and the projection image based on the main imaging data corresponding to an imaging angle of the reference imaging data and calculating a relative motion correction value respectively for the imaging angle,
   generate a relative motion correction function for correcting a relative motion of all the main imaging data or all the projection image based on the main imaging data based on the relative motion correction value, set a temporary reference center position correction function which is a function that assumes a deviation of a sample rotation axis with respect to a central axis in a detector plane of the main imaging data,
   temporarily correct the projection image based on the main imaging data with the temporary reference center position correction function and the relative motion correction function,
   acquire the temporarily corrected projection image,
   calculate a degree of coincidence between the temporarily corrected projection image and the projection image at the imaging angle opposing thereto,
   determine a reference center position correction function based on parameters of the temporary reference center position correction function, the reference center position correction function is a function representing the deviation of the sample rotation axis with respect to the central axis in the detector plane of the main imaging data, and
   correct the main imaging data or the projection image based on the main imaging data by using the reference center position correction function and the relative motion correction function.

2. The correction apparatus according to claim 1, wherein the processing circuitry is further configured to
   normalize an X-ray intensity of the main imaging data or the reference imaging data and generate a feature extracted projection image in which a feature is extracted from a projection image based on the normalized main imaging data or reference imaging data, and
   calculate the relative motion correction value based on the feature extracted projection image of the reference imaging data and the feature extracted projection image of the main imaging data corresponding thereto.

3. The correction apparatus according to claim 2, wherein the processing circuitry is further configured to perform noise removal before extracting the feature.

4. The correction apparatus according to claim 2, wherein the processing circuitry is further configured to
   temporarily correct the feature extracted projection image based on the main imaging data, and
   acquire the temporarily corrected feature extracted projection image and determine a parameter of the temporary reference center position correction function based on a degree of coincidence between the temporarily corrected feature extracted projection image and the feature extracted projection image at an imaging angle opposing thereto.

5. The correction apparatus according to claim 1,
   wherein the relative motion correction function is a polynomial of order determined based on a number of frames of reference imaging data.

6. The correction apparatus according to claim 5, wherein the order of the relative motion correction function is less than or equal to ½ of the number of frames of the reference imaging data.

7. The correction apparatus according to claim 1,
   wherein the main imaging data and the reference imaging data are data obtained with a fan beam or a cone beam,
   wherein the processing circuitry is further configured to acquire conversion data obtained based on fan-parallel conversion on the temporarily corrected projection image and determines a parameter of the temporary reference center position correction function based on a degree of coincidence between the conversion data and the conversion data at an angle opposing thereto.

8. The correction apparatus according to claim 1, wherein the calculation of the relative motion correction value or the determination of the parameter of the temporary reference center position correction function is performed based on a partial region of the projection image or the temporarily corrected projection image.

9. The correction apparatus according to claim 1, wherein the processing circuitry is further configured to perform reconstruction based on projection images based on the main imaging data corrected or the projection image based on the main imaging data and generate a CT image, and cause a displaying device to display the CT image.

10. A system comprising, a CT apparatus comprising an X-ray source for generating X-rays, a detector for detecting X-rays and a rotation control unit for controlling the rotation of the X-ray source and the detector or a sample, and the correction apparatus according to claim 1.

11. A method for correcting artifacts due to motion during CT image measurement, the method comprising the steps of:

acquiring main imaging data scanned by 360° and reference imaging data;

converting the main imaging data and the reference imaging data into projection images;

aligning the projection image based on the reference imaging data and the projection image based on the main imaging data corresponding to an imaging angle of the reference imaging data and calculating a relative motion correction value respectively for the imaging angle;

generating a relative motion correction function for correcting a relative motion of all the main imaging data or all the projection image based on the main imaging data based on the calculated relative motion correction value, setting a temporary reference center position correction function which is a function that assumes a deviation of a sample rotation axis with respect to a central axis in a detector plane of the main imaging data;

temporarily correcting the projection image based on the main imaging data with the temporary reference center position correction function and the relative motion correction function;

acquiring the temporarily corrected projection image calculating a degree of coincidence between the temporarily corrected projection image and the projection image at the imaging angle opposing thereto;

determining a reference center position correction function based on parameters of the temporary reference center position correction function, the reference center position correction function is a function representing the deviation of the sample rotation axis with respect to the central axis in the detector plane of the main imaging data, and correcting the main imaging data or the projection image based on the main imaging data using the reference center position correction function and the relative motion correction function.

12. A non-transitory computer readable recording medium having recorded thereon a program for correcting artifacts due to motion during CT image measurement, the program causing a computer to execute the processes of:

acquiring main imaging data scanned by 360° and reference imaging data;

converting the main imaging data and the reference imaging data into projection images;

aligning the projection image based on the reference imaging data and the projection image based on the main imaging data corresponding to an imaging angle of the reference imaging data and calculating a relative motion correction value respectively for the imaging angle;

generating a relative motion correction function for correcting a relative motion of all the main imaging data or all the projection image based on the main imaging data based on the calculated relative motion correction value;

setting a temporary reference center position correction function which is a function that assumes a deviation of a sample rotation axis with respect to a central axis in a detector plane of the main imaging data;

temporarily correcting the projection image based on the main imaging data with the temporary reference center position correction function and the relative motion correction function;

acquiring the temporarily corrected projection image calculating a degree of coincidence between the temporarily corrected projection image and the projection image at the imaging angle opposing thereto;

determining a reference center position correction function based on parameters of the temporary reference center position correction function, the reference center position correction function is a function representing the deviation of the sample rotation axis with respect to the central axis in the detector plane of the main imaging data, and correcting the main imaging data or the projection image based on the main imaging data using the reference center position correction function and the relative motion correction function.

* * * * *